United States Patent
Nowell et al.

(10) Patent No.: US 10,962,001 B2
(45) Date of Patent: Mar. 30, 2021

(54) FLUID END ASSEMBLY

(71) Applicant: Kerr Machine Co., Sulphur, OK (US)

(72) Inventors: Mark S. Nowell, Ardmore, OK (US);
Kelcy Jake Foster, Ardmore, OK (US);
Christopher Todd Barnett, Stratford, OK (US); Micheal Cole Thomas, Ardmore, OK (US); Brandon Scott Ayres, Ardmore, OK (US); Michael Eugene May, Ardmore, OK (US); Guy J. Lapointe, Sulphur, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 16/897,659

(22) Filed: Jun. 10, 2020

(65) Prior Publication Data
US 2020/0300240 A1    Sep. 24, 2020

Related U.S. Application Data

(63) Continuation-in-part of application No. 16/876,414, filed on May 18, 2020, which is a continuation of
(Continued)

(51) Int. Cl.
*F04B 53/22* (2006.01)
*F04B 1/0448* (2020.01)
(Continued)

(52) U.S. Cl.
CPC ............ *F04B 53/22* (2013.01); *F04B 1/0408* (2013.01); *F04B 1/0421* (2013.01);
(Continued)

(58) Field of Classification Search
CPC ........ F04B 53/22; F04B 53/16; F04B 1/0408; F04B 1/0421; F04B 1/122; F04B 1/18;
(Continued)

(56) References Cited

U.S. PATENT DOCUMENTS

| 1,316,539 A | 6/1919 | Ford |
| 1,822,682 A | 9/1931 | Weiger |

(Continued)

OTHER PUBLICATIONS

Fluid end assemblies like those disclosed in Figure 11 of U.S. Patent Publication No. 2017/0089473, were offered for sale in the United States more than 1 year prior to Jul. 14, 2017.
(Continued)

*Primary Examiner* — Jessica Cahill
*Assistant Examiner* — Patrick C Williams
(74) *Attorney, Agent, or Firm* — Tomlinson McKinstry, P.C.

(57) ABSTRACT

A fluid end having as fluid flow bores sealed without threading a retaining nut into the walls of each bore. The fluid ends may be assembled using a plurality of different kits, each kit comprising a fluid end body, a component, a retainer element, and a fastening system. The retainer element holds the component within each of the bores formed in the fluid end body and the fastening system secures the retainer element to the body. The fastening system comprises a plurality of externally threaded studs, washers and nuts in some embodiments. In other embodiments, the fastening system comprises a plurality of screws.

22 Claims, 33 Drawing Sheets

Related U.S. Application Data application No. 16/035,126, filed on Jul. 13, 2018, now Pat. No. 10,670,013.

(60) Provisional application No. 62/859,256, filed on Jun. 10, 2019, provisional application No. 62/532,574, filed on Jul. 14, 2017, provisional application No. 62/536,297, filed on Jul. 24, 2017, provisional application No. 62/562,588, filed on Sep. 25, 2017.

(51) Int. Cl.

| | | |
|---|---|---|
| *F04B 53/16* | (2006.01) | |
| *F04B 1/122* | (2020.01) | |
| *F04B 1/145* | (2020.01) | |
| *F16B 39/24* | (2006.01) | |
| *F16B 43/00* | (2006.01) | |
| *F04B 1/18* | (2020.01) | |
| *F04B 1/0408* | (2020.01) | |
| *F04B 1/0421* | (2020.01) | |
| *F16B 35/00* | (2006.01) | |
| *F04B 1/0461* | (2020.01) | |
| *F04B 1/0538* | (2020.01) | |
| *F04B 1/16* | (2006.01) | |

(52) U.S. Cl.
CPC ............ *F04B 1/0448* (2013.01); *F04B 1/122* (2013.01); *F04B 1/145* (2013.01); *F04B 1/16* (2013.01); *F04B 1/18* (2013.01); *F04B 53/16* (2013.01); *F16B 35/005* (2013.01); *F16B 39/24* (2013.01); *F16B 43/00* (2013.01); *F04B 1/0461* (2013.01); *F04B 1/0538* (2013.01); *F05B 2260/301* (2013.01)

(58) Field of Classification Search
CPC .......... F04B 1/145; F04B 1/16; F04B 1/0448; F04B 1/0461; F04B 1/0538; F16B 35/005; F16B 43/00; F16B 39/24; F05B 2260/301
See application file for complete search history.

(56) References Cited

U.S. PATENT DOCUMENTS

| | | | |
|---|---|---|---|
| 2,713,522 A | | 7/1955 | Petch |
| 2,756,960 A | | 7/1956 | Church |
| 2,856,857 A | | 10/1958 | Saalfrank |
| 3,053,500 A | * | 9/1962 | Atkinson ............ F04B 53/1025 251/332 |
| 3,146,724 A | * | 9/1964 | Cornelsen ........... F04B 11/0016 417/539 |
| 3,173,648 A | | 3/1965 | McGuire et al. |
| 3,179,121 A | | 4/1965 | Bredtschneider et al. |
| 3,257,952 A | | 6/1966 | McCormick |
| 3,373,695 A | | 3/1968 | Yohpe |
| 3,427,988 A | | 2/1969 | Redman et al. |
| 3,474,808 A | | 10/1969 | Elliott |
| 3,152,787 A | | 5/1970 | Kennedy et al. |
| 3,589,387 A | | 6/1971 | Raymond |
| 3,679,332 A | | 7/1972 | Yohpe |
| 4,047,850 A | | 9/1977 | Berthelot |
| 4,170,214 A | | 10/1979 | Gill et al. |
| 4,363,463 A | | 12/1982 | Moon, Jr. |
| 4,388,050 A | | 6/1983 | Schuller |
| 4,467,703 A | | 8/1984 | Redwine et al. |
| 4,470,771 A | | 9/1984 | Hall et al. |
| 4,520,837 A | | 6/1985 | Cole et al. |
| 4,768,933 A | | 9/1988 | Stachowiak |
| 4,771,801 A | | 9/1988 | Crump et al. |
| 4,773,833 A | | 9/1988 | Wilkinson et al. |
| 4,778,347 A | | 10/1988 | Mize |
| 4,861,241 A | | 8/1989 | Gamboa et al. |
| 4,878,815 A | | 11/1989 | Stachowiak |
| 4,948,349 A | | 8/1990 | Koiwa |
| 4,984,970 A | | 1/1991 | Eickmann |
| 5,059,101 A | | 10/1991 | Valavaara |
| 5,073,096 A | | 12/1991 | King et al. |
| 5,145,340 A | | 9/1992 | Allard |
| 5,207,242 A | | 5/1993 | Daghe et al. |
| 5,226,445 A | | 7/1993 | Surjaatmadja |
| 5,362,215 A | | 11/1994 | King |
| 5,370,148 A | | 12/1994 | Shafer |
| 5,507,219 A | | 4/1996 | Stogner |
| 5,524,902 A | | 6/1996 | Cornette |
| D383,053 S | | 9/1997 | Schrader et al. |
| 6,164,318 A | | 12/2000 | Dixon |
| 6,257,626 B1 | | 10/2001 | Campau et al. |
| 6,382,940 B1 | | 5/2002 | Blume |
| 6,419,459 B1 | | 7/2002 | Sibbing |
| 6,544,012 B1 | | 4/2003 | Blume |
| 6,641,112 B2 | | 11/2003 | Antoff et al. |
| 6,910,871 B1 | | 6/2005 | Blume |
| 7,140,211 B2 | | 11/2006 | Tremblay |
| 7,168,440 B1 | | 1/2007 | Blume |
| 7,186,097 B1 | | 3/2007 | Blume |
| 7,290,560 B2 | | 11/2007 | Orr et al. |
| 7,296,591 B2 | | 11/2007 | Moe et al. |
| 7,335,002 B2 | | 6/2008 | Vicars |
| 7,506,574 B2 | | 3/2009 | Jensen et al. |
| 7,513,759 B1 | | 4/2009 | Blume |
| D616,966 S | | 6/2010 | Angell |
| 7,789,133 B2 | | 9/2010 | McGuire |
| 7,828,053 B2 | | 11/2010 | McGuire et al. |
| 7,845,413 B2 | | 12/2010 | Shampine et al. |
| D631,142 S | | 1/2011 | Angell |
| 7,963,502 B2 | | 6/2011 | Lovell et al. |
| 8,100,407 B2 | | 1/2012 | Stanton et al. |
| 8,317,498 B2 | | 11/2012 | Gambier et al. |
| 8,360,094 B2 | * | 1/2013 | Steinbock ............ E21B 17/085 137/454.6 |
| 8,528,462 B2 | | 9/2013 | Pacht |
| 8,528,585 B2 | | 9/2013 | McGuire |
| 8,701,546 B2 | | 4/2014 | Pacht |
| 9,010,412 B2 | | 4/2015 | McGuire |
| D731,035 S | | 6/2015 | Lo Cicero |
| D737,497 S | | 8/2015 | Burgess et al. |
| 9,188,121 B1 | | 11/2015 | Dille |
| D748,228 S | | 1/2016 | Bayyouk et al. |
| 9,371,919 B2 | | 1/2016 | Forrest et al. |
| 9,260,933 B2 | | 2/2016 | Artherholt et al. |
| 9,328,745 B2 | * | 5/2016 | Bartlok ..................... F15B 1/04 |
| 9,416,887 B2 | | 8/2016 | Blume |
| 9,435,454 B2 | | 9/2016 | Blume |
| 9,534,473 B2 | | 1/2017 | Morris et al. |
| 9,631,739 B2 | | 4/2017 | Belshan et al. |
| D787,029 S | | 5/2017 | Bayyouk et al. |
| 9,732,746 B2 | | 8/2017 | Chandrasekaran et al. |
| 9,822,894 B2 | | 11/2017 | Bayyouk et al. |
| D806,241 S | | 12/2017 | Swinney et al. |
| 10,184,470 B2 | | 1/2019 | Barnett, Jr. |
| 2002/0166588 A1 | | 11/2002 | Dean |
| 2004/0170507 A1 | | 9/2004 | Vicars |
| 2004/0234404 A1 | | 11/2004 | Vicars |
| 2006/0002806 A1 | | 1/2006 | Baxter et al. |
| 2006/0027779 A1 | | 2/2006 | McGuire et al. |
| 2008/0006089 A1 | | 1/2008 | Adnan et al. |
| 2008/0008605 A1 | | 1/2008 | Bauer et al. |
| 2008/0093361 A1 | | 4/2008 | Kennedy et al. |
| 2008/0279706 A1 | | 11/2008 | Gambier et al. |
| 2010/0243255 A1 | | 9/2010 | Luharuka et al. |
| 2011/0079302 A1 | | 4/2011 | Hawes |
| 2011/0189040 A1 | | 4/2011 | Vicars |
| 2011/0173814 A1 | | 7/2011 | Patel |
| 2011/0206547 A1 | | 8/2011 | Kim et al. |
| 2012/0063936 A1 | | 3/2012 | Baxter et al. |
| 2012/0141308 A1 | | 6/2012 | Saini et al. |
| 2012/0187321 A1 | | 7/2012 | Small |
| 2013/0020521 A1 | | 1/2013 | Byrne |
| 2013/0112074 A1 | | 5/2013 | Small |
| 2013/0202458 A1 | | 8/2013 | Byrne et al. |
| 2013/0319220 A1 | | 12/2013 | Luharuka et al. |
| 2014/0127062 A1 | | 5/2014 | Buckley et al. |

(56) References Cited

U.S. PATENT DOCUMENTS

| | | |
|---|---|---|
| 2014/0196883 A1 | 7/2014 | Artherholt et al. |
| 2014/0348677 A1 | 11/2014 | Moeller et al. |
| 2015/0084335 A1 | 3/2015 | Farrell et al. |
| 2015/0132157 A1 | 5/2015 | Whaley et al. |
| 2015/0144826 A1 | 5/2015 | Bayyouk et al. |
| 2016/0123313 A1 | 5/2016 | Simmons |
| 2016/0160848 A1 | 6/2016 | Toppings et al. |
| 2017/0002947 A1 | 1/2017 | Bayyouk et al. |
| 2017/0089473 A1 | 3/2017 | Nowell et al. |
| 2017/0204852 A1 | 7/2017 | Barnett |
| 2017/0211565 A1 | 7/2017 | Morreale |
| 2018/0017173 A1 | 1/2018 | Nowell et al. |
| 2018/0313456 A1 | 11/2018 | Bayyouk et al. |
| 2019/0011051 A1 | 1/2019 | Yeung |
| 2019/0128104 A1 | 5/2019 | Graham |

OTHER PUBLICATIONS

Exhibit "A" includes cross-sectional views of fluid end assemblies known in the art prior to Jul. 14, 2017. 4 pages.
Exhibit "B" includes side view of valve seats known in the art prior to Jul. 14, 2017. 2 pages.
Exhibit "C" is a cross-sectional view of a plunger end of a fluid end assembly known in the art prior to Jul. 14, 2017. 1 page.
Exhibit "D" is an engineering drawing of a mud pump known in the art prior to Jul. 14, 2017. 4 pages.
International Search Authority "PCT International Search Report", dated Mar. 31, 2020, 3 pages, Korean Intellectual Property Office, Republic of Korea.
National Oilwell Varco 267Q-6M Quintuplex Plunger Pump Parts List, issued Sep. 6, 2000 and revised Jul. 21, 2008 (NOV-267Q), 13 pages.
Gradner Denver, Well Servicing Pump, Model GD-3000 Operating and Service Manual, dated Apr. 2011, (GD-3000), 44 pages.
U.S. Patent and Trademark Office File History for U.S. Pat. No. 10,591,070, 168 pages, Alexandria, VA—See USPTO Records.
Exhibit E—U.S. Patent and Trademark Office File History for U.S. Appl. No. 62/234,483, 45 pages, Alexandria, VA.
Exhibit F—U.S. Patent and Trademark Office File History for U.S. Appl. No. 62/315,343, 41 pages, Alexandria, VA.
Exhibit G—U.S. Patent and Trademark Office File History for U.S. Appl. No. 62/318,542, 44 pages, Alexandria, VA.
Exhibit H—U.S. Patent and Trademark Office File History for U.S. Appl. No. 62/346,915, 41 pages, Alexandria, VA.
U.S. Patent and Trademark Office File History for U.S. Pat. No. 10,591,070, 353 pages, Alexandria, VA—See USPTO Records.
U.S. Patent and Trademark Office File History for U.S. Appl. No. 15/719,124, 183 pages, Alexandria, VA—See USPTO Records.
Exhibit K—Susan Woods, Groove Milling, Cutting Tool Engineering, published Aug. 1, 2012, 11 pages.
Exhibit L—"Weir SPM General Catalog" (2009), 40 pages.
Exhibit M—Groovex, "Groove Milling, High Precision Tools for Groove Milling" brochure, Edition 04, dated Dec. 2012, 24 pages.
Exhibit N—Ricky Smith & R. Keith Mobley, Rules of Thumb for Maintenance and Reliability Engineers, 239-250 (2008), 15 pages.
Exhibit O—Ross Mackay, "Process engineering: Properly seal that pump", Chemical Processing, dated May 17, 2005, 11 pages.
Exhibit P—Vargus Ltd., "Groovex Groove milling", YouTube (Dec. 12, 2011, https://www.youtube.com/watch?v=vrFzHJUXjvk, 68 pages.
Exhibit Q—Paresh Girdhar, Octo Moniz, & Steve Mackay, Centrifugal Pump Design, "Plant and Process Engineering 360°", 521-536 (2004), 21 pages.
Exhibit R—Paresh Girdhar, Octo Moniz, & Steve Mackay, Centrifugal Pump Design and Construction, Practical "Centrifugal Pumps: Design, Operation and Maintenance", 18-47 (2005), 33 pages.
Exhibit S—Gardner Denver, "Well Servicing Pump", Model HD-2250 Operating and Service Manual, dated Jan. 2005, 44 pages.
Exhibit T—Robert Crosier, "Flush Free Sealing Benefits", Empowering Pumps & Equipment, dated Oct. 3, 2011, 5 pages.
Exhibit U—Cat "Quintuplex Well Stimulation Pump", WS255 (2013), 2 pages.
Exhibit V—Oxford "Dictionary of Mechanical Engineering", excerpted (2013), 10 pages.
Exhibit W—United States Patent and Trademark Office, Before the Patent Trial and Appeal Board, "Cizion, LLC d/b/a Vulcan Industrial Manufacturing, Petitioner v. Kerr Maching Co., Patent Owner" Case PGR2020-00065 Patent 10,591,070, Petition for Post-Grant Review of U.S. Pat. No. 10,591,070 Under 35 U.S.C. Section 321-329 and 37 C.F.R. Section 42.200 ET SEQ.—197 pages.
Exhibits X-AA include photos of a power end and fluid end known in the art prior to Dec. 11, 2017, 4 pages.
Exhibit BB is a photograph of a fluid end offered for sale in the United States more than one year prior to Jun. 10, 2019, and also includes patent drawing of a fluid end similar to that shown in the photograph. The drawing was included in U.S. Appl. No. 62/532,574, filed Jul. 14, 2017, 2 pages.
Wikipedia, Washer (hardware), 2017, first page; 10 pages.

* cited by examiner

FLUID END ASSEMBLY

SUMMARY

The present disclosure is directed to a fluid end assembly. The fluid end assembly comprises a housing having an external surface and an internal chamber, a first conduit formed in the housing and having first and second sections, each section independently interconnecting the internal chamber and the external surface, and a second conduit formed in the housing, intersecting the first conduit and having third and fourth sections, each section independently interconnecting the internal chamber and the external surface. The fluid end assembly also comprises a non-threaded component installed within the third section, and a plurality of packing seals installed within the component. The fluid end assembly further comprises a retainer engaged with the component, and a fastening system installed within the retainer and the housing and configured to releasably hold the retainer against the component.

BRIEF DESCRIPTION OF THE DRAWINGS

FIG. 1 shows a suction and discharge end of the fluid end.

FIG. 4 shows a suction and discharge end of the fluid end.

FIG. 7 shows a suction and discharge end of the fluid end.

FIG. 9 shows a suction and discharge end of the fluid end.

FIG. 12 shows a suction and discharge end of the fluid end.

FIG. 14 shows a suction and discharge end of the fluid end.

DETAILED DESCRIPTION

Fluid end assemblies are typically used in oil and gas operations to deliver highly pressurized corrosive and/or abrasive fluids to piping leading to the wellbore. The assemblies are typically attached to power ends run by engines. The power ends reciprocate plungers within the assemblies to pump fluid throughout the fluid end. The power end used with the fluid end typically has a power output of at least 2,250 horsepower during hydraulic fracturing operations.

Fluid may be pumped through the fluid end at pressures that range from 5,000-15,000 pounds per square inch (psi). Fluid used in high pressure hydraulic fracturing operations is typically pumped through the fluid end at a minimum of 8,000 psi; however, fluid will normally be pumped through the fluid end at pressures around 10,000-15,000 psi during such operations.

In fluid end assemblies known in the art, the fluid flow passages or bores formed within the fluid end body are typically sealed by inserting a plug into each bore. A large retaining nut is then installed into each bore above the plug. The retaining nuts typically thread into internal threads formed in the walls of each bore.

In operation, the high level of fluid pressure pumping throughout the fluid end may cause the retaining nuts to back off or unthread from their installed position. When a retaining nut unthreads from its installed position, the plug it was retaining may be displaced by fluid pressure. Displacement of the plug allows fluid to leak around the plug and erode the walls of the bore. The internal threads formed in the bores for engagement with the retaining nuts are also known to crack over time. Erosion of the bore walls or cracking of the internal threads typically requires repair or replacement of the fluid end.

The present invention is directed to a plurality of different fluid ends having bores sealed without threading retaining nuts into the walls of each bore. As a result, the fluid ends of the present invention do not have internal threads formed in their bores proximate the bore openings. Removal of the internal threads eliminates the problems associated with the internal thread failures and the retaining nuts becoming unthreaded from the bores.

Figure 1:
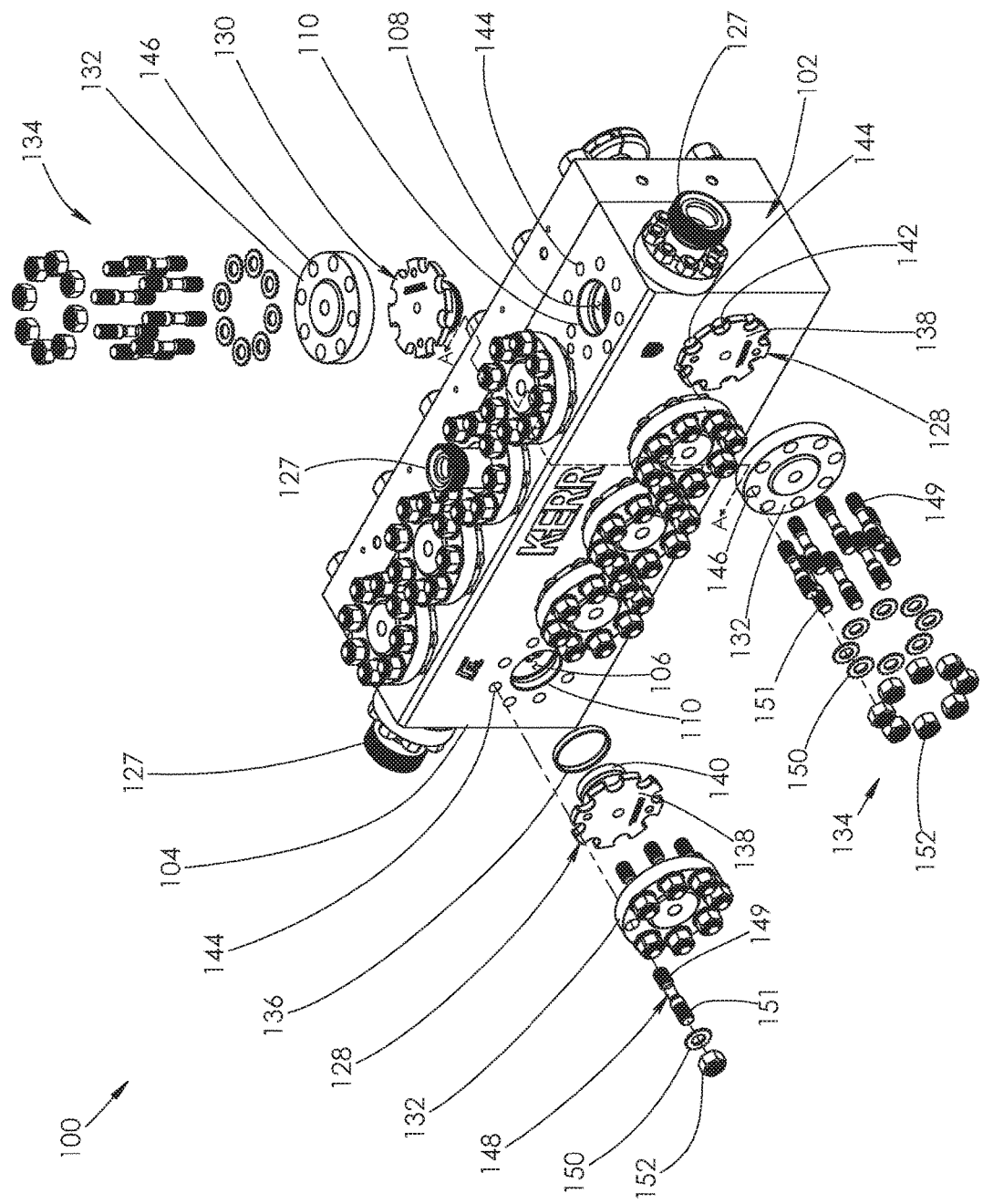
FIG. 1 is a partially exploded view of a first embodiment of a fluid end of the present invention.
Figure 3:
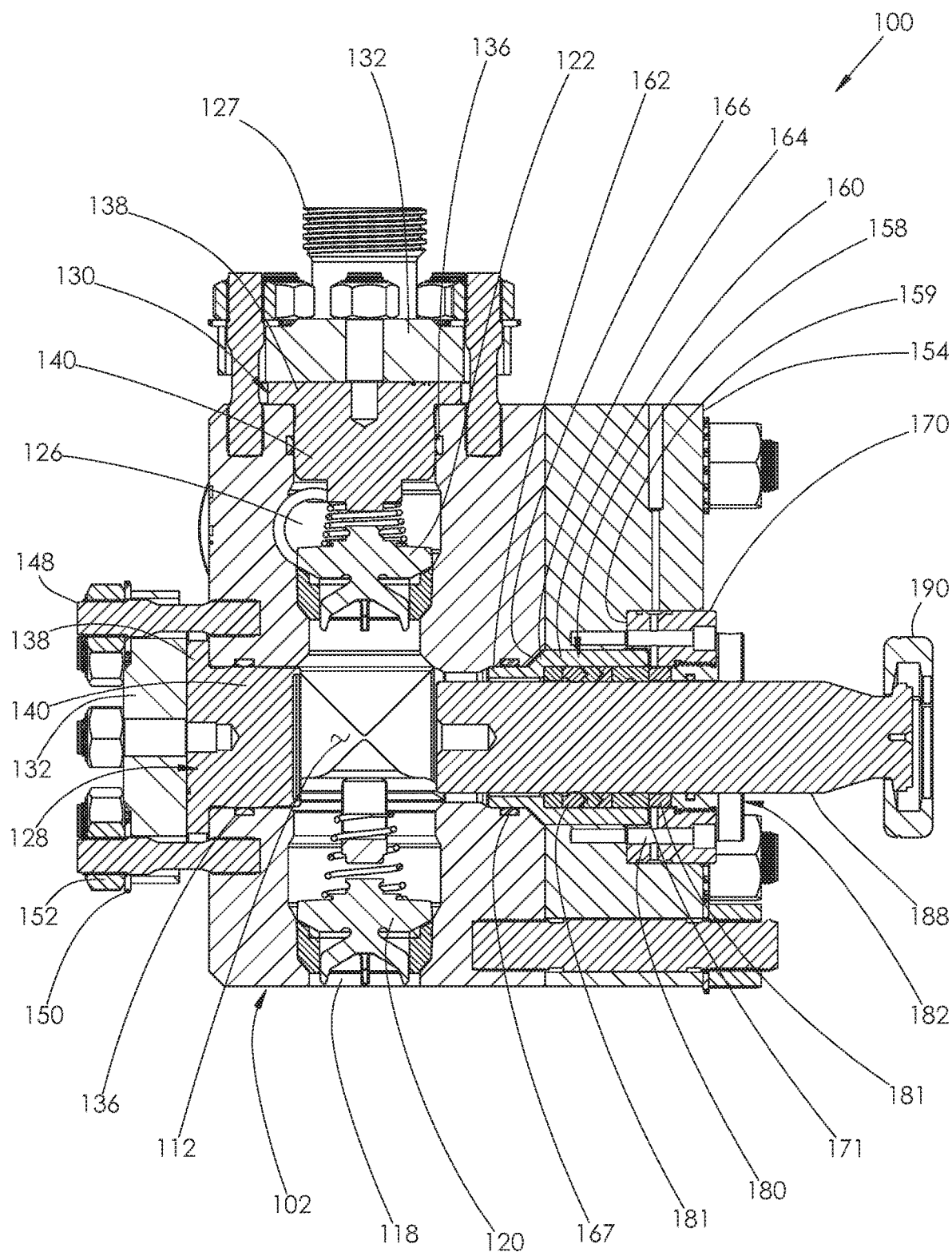
FIG. 3 is a cross-sectional view of the fluid end shown in FIG. 1, taken along line A-A.

With reference to FIGS. 1 and 3, a first embodiment of a fluid end 100 is shown. The fluid end 100 comprises a housing or fluid end body 102 having a flat external surface 104 and a plurality of first and second bores 106, 108 formed adjacent one another therein, as shown in FIG. 1. The first bores 106 may also be referred to as vertical conduits, and the second bores 108 may also be referred to as horizontal conduits. Preferably, the number of first bores 106 equals the number of second bores 108. More preferably, each first bore 106 intersects its paired second bore 108 within the fluid end body 102 to form an internal chamber 112, as shown in FIG. 3. The first bore 106 comprises first and second sections positioned on opposite sides of the internal chamber 112. Likewise, the second bore 108 comprises third and fourth sections positioned on opposite sides of the internal chamber 112.

Figure 4:
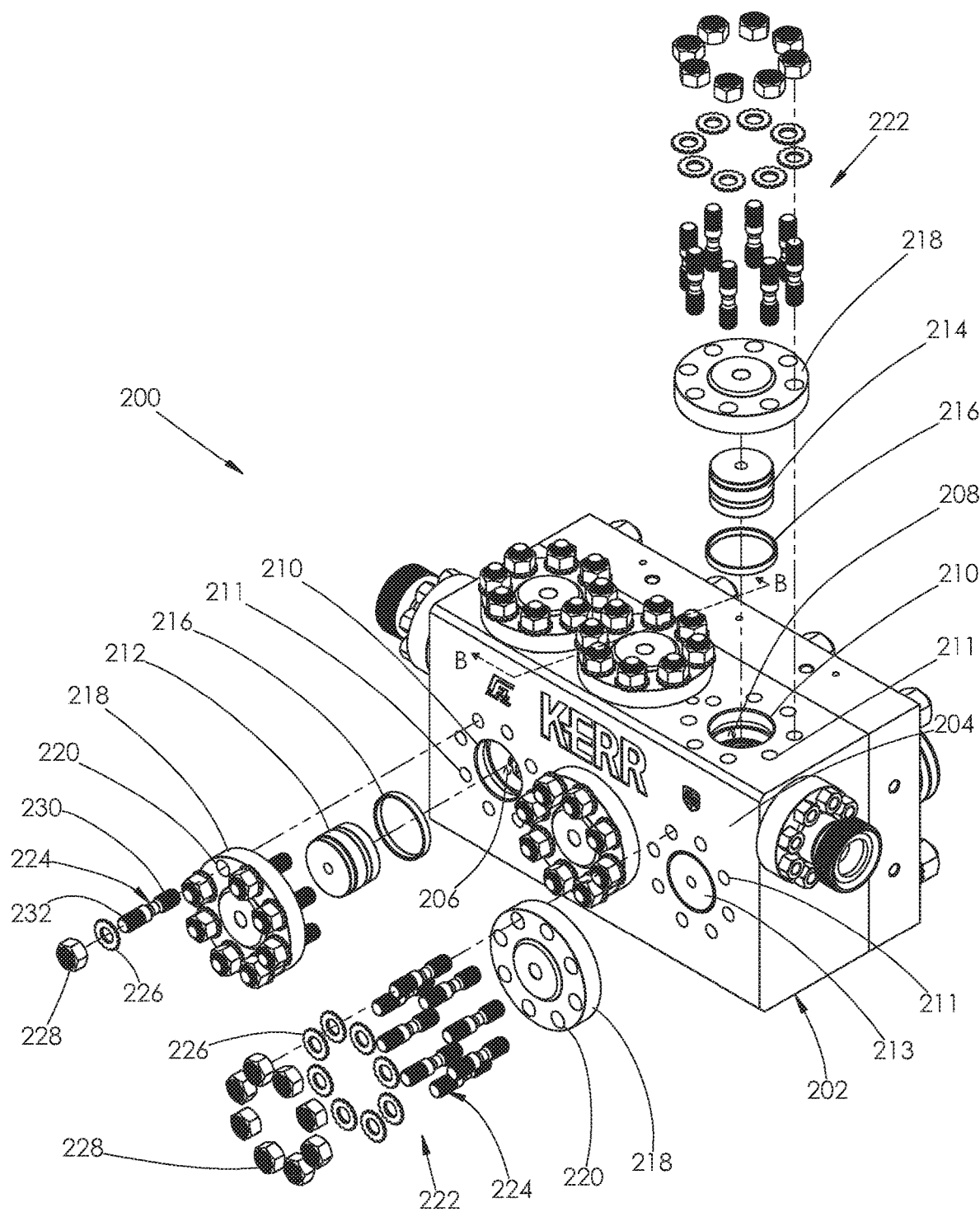
FIG. 4 is a partially exploded view of a second embodiment of a fluid end.

FIG. 1 shows live first and second bores 106, 108. In alternative embodiments, the number of sets of paired first and second bores in the fluid end body may be greater than five, or less than five. Thus, FIG. 4 shows a fluid end body that includes three sets of paired first and second bores. Each bore of each set of paired bores 106 and 108 terminates in a corresponding opening 110 formed in the external surface 104. The bores 106 and 108 and openings 110 exist in one-to-one relationship. A plurality of internally threaded openings 144 are formed in the body 102 and uniformly spaced around each bore opening 110, as shown in FIG. 1.

With reference to FIG. 3, each second bore 108 may have an intake opening 118 formed proximate the bottom end of the fluid end body 102. Each intake opening 118 is connected in one-to-one relationship to a corresponding coupler or pipe. These couplers or pipes are fed from a single common piping system (not shown)

A pair of valves 120 and 122 are positioned within each second bore 108. The valves 120, 122 route fluid flow within the body 102. The intake valve 120 blocks fluid backflow through the intake opening 118. The discharge valve 122 regulates fluid through one or more discharge openings 126. A plurality of couplers 127 may be attached to each discharge opening 126 for connection to a piping system (not shown), as shown in FIG. 1.

Continuing with FIGS. 1 and 3, the fluid end 100 further comprises a plurality of sets of components 128 and 130. The number of sets preferably equals the number of sets of paired first and second bores 106 and 108 formed in the body 102. The component 128 is positioned within a first bore 106, and the component 130 is positioned within its paired second bore 108. In one embodiment, the component 128 is a suction plug and the component 130 is a discharge plug. Each of the components 128 and 130 are substantially identical in shape and construction, and each is sized to fully block fluid flow within the respective bore 106, 108. A seal 136 is positioned around the outer surface of each component 128, 130 to block fluid from leaking from the bores 106, 108.

Each of the components 128 and 130 comprises a first section 138 joined to a second section 140. The first section 138 has a footprint sized to cover the bore opening 110 and the second section 140 is configured for removable receipt within one of the bores 106, 108. In one embodiment, the first section 138 is an enlarged plate and the second section 140 is a plug sized to be closely received within one of the bores 106, 108. When the component 128 or 130 is installed within one of the bores 106, 108, the first section 138 engages with the external surface 104 of the body 102. This engagement prevents longitudinal movement of the second section 140 within the bore 106 or 108 as shown in FIG. 3.

With reference to FIG. 1, the first section 138 may be formed as a circular structure having a plurality of notches 142 cut from its outer periphery. When each of the first sections 138 is engaged with the external surface 104 of the body 102, each of the notches 142 partially surrounds one of the openings 144 spaced around each bore opening 110.

Continuing with FIGS. 1 and 3, once each component 128, 130 is installed in the fluid end body 102, each of the components 128, 130 is secured in place by a retainer element 132 in a one-to-one relationship. Each retainer element 132 has a footprint sized to fully cover the first section 138 of the components 128 and 130. The retainer elements 132 shown in FIG. 1 are flat and cylindrical. A plurality of openings 146 are formed about the periphery of each retainer element 132. Each opening 146 is alignable with a corresponding one of the openings 144 in a one-to-one relationship.

Each of the retainer elements 132 is secured to the fluid end body 102 using a fastening system 134. The fastening system comprises a plurality of studs 148, a plurality of washers 150, and a plurality of nuts 152. Each stud 148 is externally threaded adjacent its first end 149, while each opening 144 has internal threads that mate with those of the stud 148. Each stud 148 may be threaded into place within a corresponding one of the openings 144, in a one-to-one relationship.

Once a first stud 148 has been installed in the body 102 at its first end 149, its opposed second end 151 projects from the body's external surface 104. When each component 128 is positioned within its bore 106, each of its notches 142 at least partially surrounds a corresponding one of the studs 148. Likewise, when each component 130 is positioned within its bore 108, each of its notches 142 at least partially surrounds a corresponding one of the studs 148.

Each peripheral opening 146 formed in each of the retainer elements 132 is registerable with a corresponding one of the studs 148. The plurality of washers 150 and nuts 152 may be installed and torqued on each one of the studs 148. The plurality of washers 150 and nuts 162 hold the retainer element 132 against the first section 138 of the components 128, 130 and hold the first section 138 against the external surface 104 of the fluid end body 102. Because each of the retainer elements 132 is attached to the fluid end body 102 using the fastening system 134, no external threads are formed on the outer surface of each retainer element 132. Likewise, no internal threads are formed within the walls of each bore 106, 108.

Figure 2:
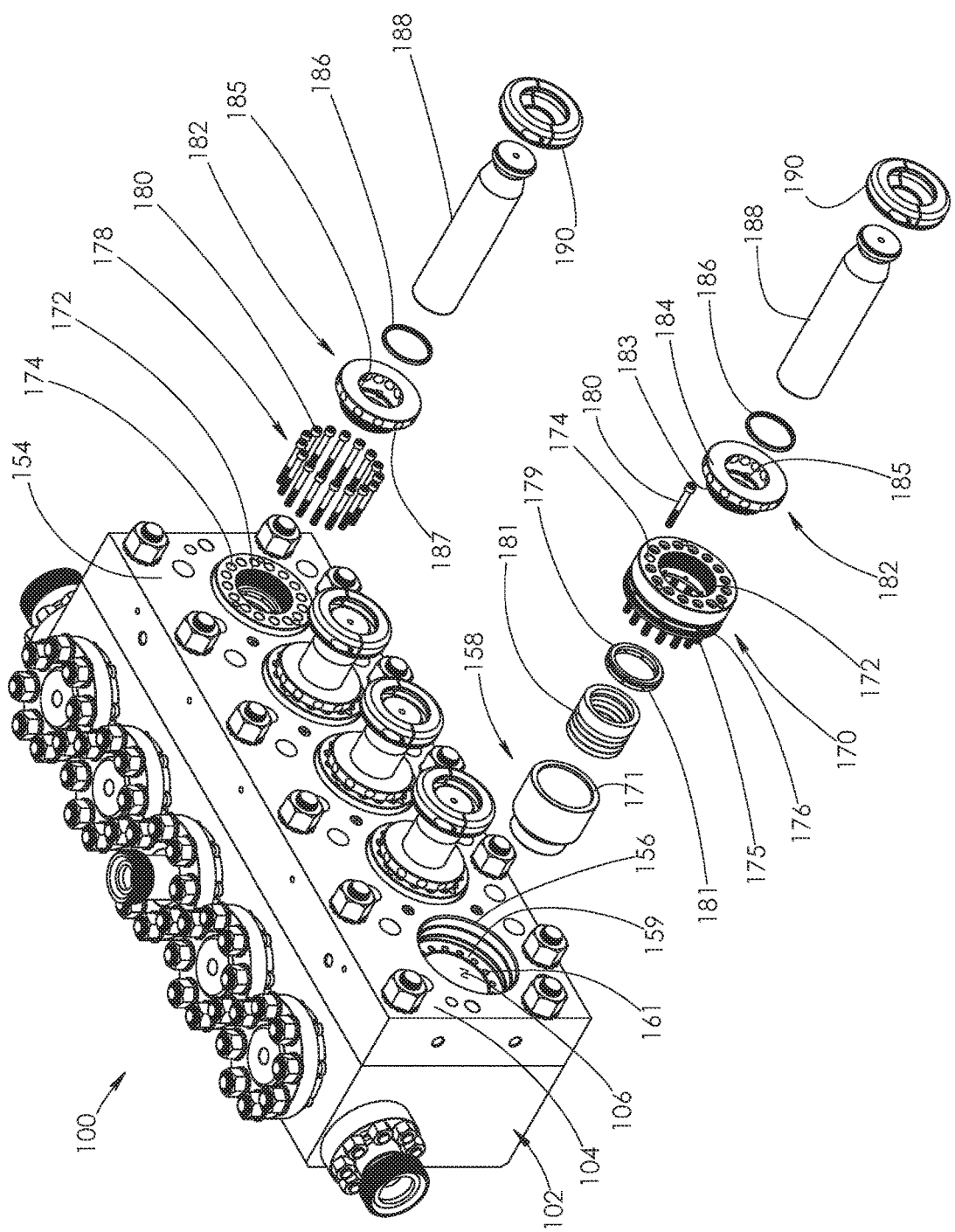
FIG. 2 is a partially exploded view of a plunger end of the fluid end body shown in FIG. 1.

With reference to FIGS. 2 and 3, a plunger end 164 of the fluid end 100 is shown. The plurality of first bores 106 terminate at openings 156 formed on the external surface 104 of the plunger end 154. An internal seat 159 is formed in the walls of each of to the bores 106 proximate each of the bore openings 156. A plurality of threaded openings 161 are formed in each of the internal seats 159, as shown in FIG. 2.

A component 158 is positioned within each first bore 106 through each of the openings 156. Each of the components 158 is tubular and sized to be closely received within each bore 106. In one embodiment, the components 158 are stuffing box sleeves, With reference to FIG. 3, each of the components 158 may have a first or rear section 160 that joins a second or front section 162 via a tapered section 164. The first section 160 may have a larger diameter than the second section 162, When each of the components 158 are installed within each of the bores 106, the tapered section 164 engages a tapered seat 166 formed in the walls of each bores 106. This engagement prevents longitudinal movement of each component 158 within each bore 106. A seal 167 is positioned around the outer surface of the second section 162 of each of the components 158 in order to block fluid from leaking from the bores 106.

Once installed within the body 102, each component 158 is secured in place by a retainer element 170 in a one-to-one relationship. Each of the retainer elements 170 is sized to be closely received within each bore 106 and engage a top surface 171 of each component 158, as shown in FIG. 3. Each of the retainer elements 170 shown in FIG. 2 has a cylindrical body and a threaded central opening 172. A plurality of openings 174 are formed about the periphery of each of the retainer elements 170. The openings 174 are uniformly spaced around each central opening 172.

A plurality of ports 175 may be formed in an outer surface of each retainer element 170 that are orthogonal to the plurality of openings 174. At least one seal 176 may also be disposed around the outer surface of each of the retainer elements 170. The seal 176 helps block fluid from leaking from the bores 106.

Each of the retainer elements 170 is secured to the fluid end body 102 using a fastening system 178. The fastening system 178 comprises a plurality of threaded screws 180. The screws 180 are preferably socket-headed cap screws.

The fastening system 178 secures each retainer element 170 to each internal seat 159. When each retainer element 170 is positioned within each bore 106, each of the peripheral openings 174 is alignable with a corresponding one of the openings 161 in a one-to-one relationship. Each of the screws 180 is registerable within one of the openings 161 in the seat 159 and one of the peripheral openings 174 in the retainer element 170.

The screws 180 may be torqued as desired to tightly attach each of the retainer elements 170 to each internal seat 159 and securely hold each component 158 within each bore 106. Because each of the retainer elements 170 is attached to the fluid end body 102 using the fastening system 178, no external threads are formed on the outer surface of each of the retainer elements 170. Likewise, no internal threads are formed within the walls of each bore 106 on the plunger end 154 of the body 102.

Continuing with FIGS. 2-3, a plurality of packing seals 181 may be positioned within each of the components 158 and each of the retainer elements 170 to prevent fluid from leaking from the bores 106. At least one of the packing seals 181 may have a plurality of ports 179 formed in its outer periphery, as shown in FIG. 2. The ports 179 provide an exit for fluid trapped within the packing seals 181. Fluid exiting the ports 179 may exit the retainer element 170 through the ports 175.

A packing nut 182 may also be threaded into the central opening 172 of each of the retainer elements 170 in a one-to-one relationship. The packing nut 182 has a threaded section 183 joined to a body 184. The body 184 shown in FIG. 2 is cylindrical. However, the body 184 may also be square or rectangular shaped. A central passage 185 extends through the threaded section 183 and the body 184. The threaded section 183 of the packing nut 182 is threaded into the central opening 172 of the retainer element 170.

When installed within each of the retainer elements 170, each of the packing nuts 182 engages with and compresses the packing seals 181 installed within to each component 158 and retainer element 170, as shown in FIG. 3. Compression of the packing seals 181 helps prevent fluid from leaking past the seals 181. A seal 186 may also be positioned within the central passage 185 of each of the packing nuts 182 to further seal fluid from leaking from the bores 106.

A plurality of holes 187 are formed around the outer surface of each of the packing nut bodies 184. The holes 187 serve as connection points for a spanner wrench that may be used to tightly thread the packing nut 182 into the central opening 172 of each of the retainer elements 170.

A plunger 188 may also be installed within each bore 106 in a one-to-one relationship. When a plunger 188 is installed within a bore 106, the plunger 188 is positioned within the component 158, the retainer element 170, and the packing nut 182, as shown in FIG. 3. Each of the plungers 188 projects from the plunger end 154 of the fluid end body 102 and is attached to a separate power end. As discussed above, the power end reciprocates each of the plungers 188 within the fluid end body 102 so as to pump fluid throughout the body. Each of the plungers 188 may be attached to the power end via a clamp 190 in a one-to-one relationship.

Several kits are useful for assembling the fluid end 100. A first kit comprises a plurality of the components 128 or 130, a plurality of the retainer elements 132, and the fastening system 134. A second kit may comprise the plurality of components 158, a plurality of the retainer elements 170, and the fastening system 178. The second kit may further comprise a plurality of the packing seals 181, a plurality of the packing nuts 182, and a plurality of the plungers 188. Each of the kits may be assembled using, the fluid end body 102.

Figure 6:
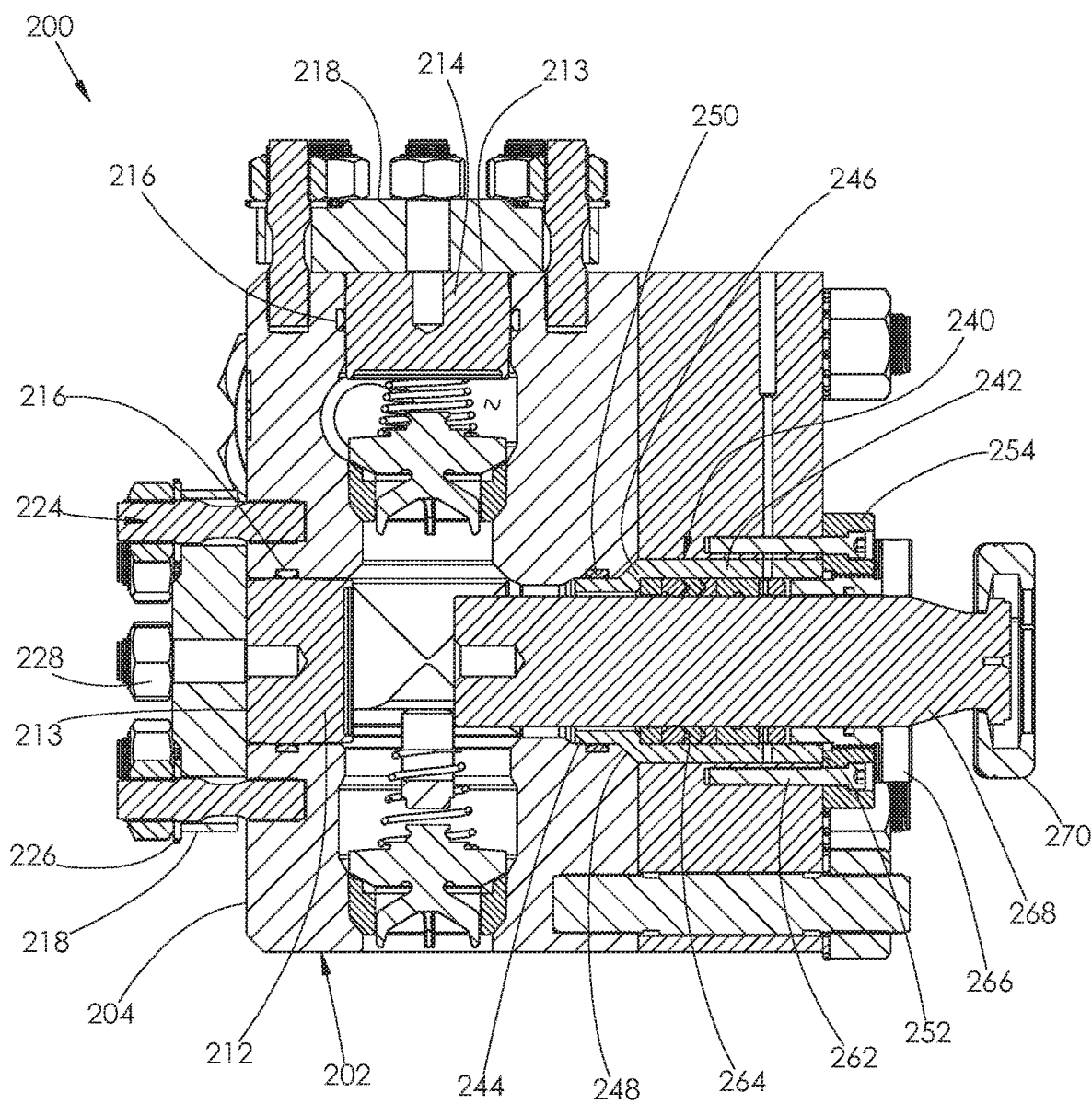
FIG. 6 is a cross-sectional view of the fluid end shown in FIG. 4, taken along line B-B.

With reference to FIGS. 4 and 6, a second embodiment of a fluid end 200 is shown. The fluid end 200 comprises a housing or fluid end body 202 having a flat external surface 204 and a plurality of first and second bores 206, 208 formed adjacent one another therein, as shown in FIG. 4. Each bore of each set of paired bores 206 and 208 terminates in a corresponding opening 210 formed in the external surface 204. A plurality of threaded openings 211 are formed in the body 202 and uniformly spaced around each opening 210. The internal functions of the fluid end 200 are identical to those described with reference to fluid end 100, shown in FIG. 3.

The fluid end 200 further comprises a plurality of sets of components 212 and 214. The number of sets preferably equals the number of set of paired first and second bores 206 and 208 formed in the body 202. The component 212 is positioned within a first bore 206, and the component 214 is positioned within its paired second bore 208. In one embodiment, the component 212 is a suction plug and the component 214 is a discharge plug.

Each of the components 212 and 214 is substantially identical in shape and construction, and is sized to fully block fluid flow within the respective bore 206, 208. A seal 216 is positioned around the outer surface of each component 212, 214 to block fluid from leaking from the bores 206, 208.

As shown in FIG. 4, a top surface 213 of each component 212, 214 may sit flush with the external surface 204 of the body 202 when installed within a respective bore 206, 208. Each of the components 212 and 214 may engage with internal seats (not shown) formed in the walls of each of the bores 206, 208. Such engagement helps prevent longitudinal movement of the components 212, 214 within the respective bore 206, 208.

Once installed within the fluid end body 202, each component 212 and 214 is secured in place by a retainer element 218 in a one-to-one relationship. Each of the retainer elements 218 has a footprint sized to cover a single bore opening 210. The retainer elements 218 shown in FIG. 4 are flat and cylindrical. A plurality of openings 220 are formed about the periphery of each retainer element 218. Each peripheral opening 220 is alignable with a corresponding one of the openings 211 in a one-to-one relationship, as shown in FIG. 4.

The retainer elements 218 are secured to the external surface 204 of the fluid end body 202 by a fastening system 222. The fastening system 222 comprises a plurality of externally threaded studs 224, a plurality of washers 226, and a plurality of internally threaded nuts 228. Each stud 224 is externally threaded adjacent its first end 230, while each opening 211 has internal threads that mate with those of the stud 224. Each stud 224 may be threaded into place within a corresponding one of the openings 211, in a one-to-one relationship.

Once a first stud 224 has been installed in the body 202 at its first end 230, its opposed second end 232 projects from the body's external surface 204. Each peripheral opening 220 formed in the retainer elements 218 is registerable with a corresponding one of the studs 224. The plurality of washers 226 and nuts 228 may be installed and torqued on each of the studs 224. The plurality of washers 226 and nuts 228 hold the retainer elements 218 against the external surface 204 of the fluid end body 202. Because each of the retainer elements 218 is attached to the fluid end body 202 using the fastening system 222, no external threads are formed on the outer surface of each retainer element 218. Likewise, no internal threads are formed within the walls of each bore 206 and 208.

Figure 5:
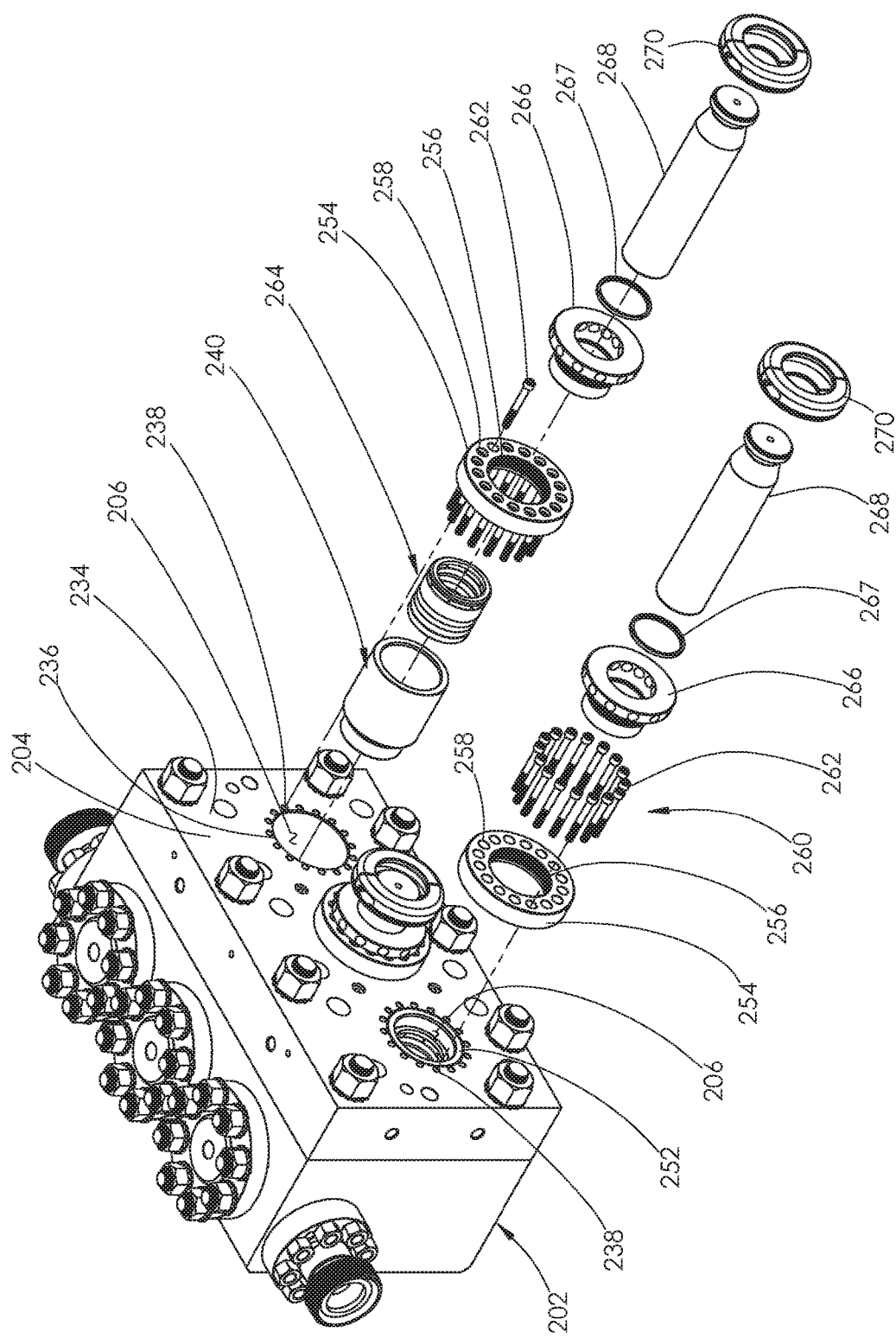
FIG. 5 is a partially exploded view of a plunger end of the fluid end body shown in FIG. 4.

With reference to FIGS. 5-6, a plunger end 234 of the fluid end 200 is shown. The plurality of first bores 206 terminate at openings 236 formed on the external surface 204 of the plunger end 234. The plunger end 234 of the fluid end body 202 is similar to the plunger end 154 of fluid end body 102, shown in FIGS. 2-3, except that an internal seat 159 is not formed within each bore 206. Instead, a plurality of internally threaded openings 238 are formed in the external surface 204 of the fluid end body 202 that are uniformly spaced around each bore opening 236.

A component 240 is positioned within each first bore 206 through each of the openings 236 in a one-to-one relationship. Each of the components 240 is tubular and sized to be closely received within each bore 206. In one embodiment, the components 240 are stuffing box sleeves.

With reference to FIG. 6, each of the components 240 may have a first or rear section 242 that joins a second or front section 244 via a tapered section 246. The first section 242 may have a larger diameter than the second section 244. When each of the components 240 are installed within each of the bores 206, the tapered section 246 engages a tapered seat 248 formed in the walls of each bore 206. This engagement prevents longitudinal movement of each component 240 within each bore 206. A seal 250 is positioned around the outer surface of the second section 244 of each of the components 240 to block fluid from leaking from the bores 206.

Once installed within the body 202, a top surface 252 of each of the components 240 may sit flush with the external surface 204 of the body 202. Each of the components 240 is secured in place within each bore 206 by a retainer element 254 in a one-to-one relationship. The retainer elements 254 shown in FIG. 5 have a cylindrical body and a threaded central opening 256. A plurality of openings 258 are formed about the periphery of each of the retainer elements 254. The openings 258 are uniformly spaced around each central opening 256.

The retainer elements 254 are secured to the external surface 204 of the fluid end body 202 using a fastening system 260. The fastening system 260 comprises a plurality of threaded screws 262. The screws 262 are preferably socket-headed cap screws. When each retainer element 254 is positioned over each bore opening 236, each of the peripheral openings 258 is alignable with a corresponding one of the openings 238 in a one-to-one relationship. Each of the screws 262 is registerable within one of the openings 238 in the body 202 and one of the peripheral openings 258 in each of the retainer elements 254.

The screws 262 may be torqued as desired to tightly attach each of the retainer elements 254 to the body 202 and securely hold each of the components 240 within each bore 206. Because each of the retainer elements 254 is attached to the fluid end body 202 using the fastening system 260, no external threads are formed on the outer surface of each retainer element 254. Likewise, no internal threads are formed within the walls of each bore 206 on the plunger end 234 of the body 202.

Similar to the plunger end 154 shown in FIG. 2, a plurality of packing seals 264 may be positioned within each of the components 240. A packing nut 266 may thread into the central opening 256 of each retainer element 254 and compress the packing seals 264. A seal 267 may also be positioned within each packing nut 266. Additionally, a plurality of plungers 268 may be disposed within each component 240, retainer element 254, and packing nut 266. Each of the plungers 268 may be attached to a power end via a clamp 270.

In alternative embodiments, the components 212, 214, and 240 may not be flush with the external surface 204 of the body 202 when installed in the respective bores 206, 208. In such case, a flange or ledge may be formed on each of the retainer elements 218 or 254 on its side facing the component 212, 214, or 240. The flange or ledge may be installed within the bores 206, 208 so that it tightly engages the top surface 213 or 252 of the components 212, 214, or 240.

Likewise, if the components 212, 214, or 240 project from the external surface 204 of the body 202 when installed within the respective bores 206, 208, the retainer elements 218 or 254 can be modified to accommodate the component 212, 214, or 240. For example, a cut-out may be formed in the retainer element 218 or 254 for closely receiving the portion of the component 212, 214, or 240 projecting from the body 202. The area of the retainer element 218 or 254 surrounding the cut-out will engage the external surface 204 of the body 202.

Several kits are useful for assembling the fluid end 200. A first kit comprises a plurality of the components 212 or 214, a plurality of retainer elements 218, and the fastening system 222. A second kit may comprise the plurality of components 240, a plurality of the retainer elements 254, and the fastening system 260. The second kit may further comprise a plurality of packing seals 264, a plurality of packing nuts 266, and a plurality of plungers 268. Each of the kits may be assembled using the fluid end body 202.

Figure 7:
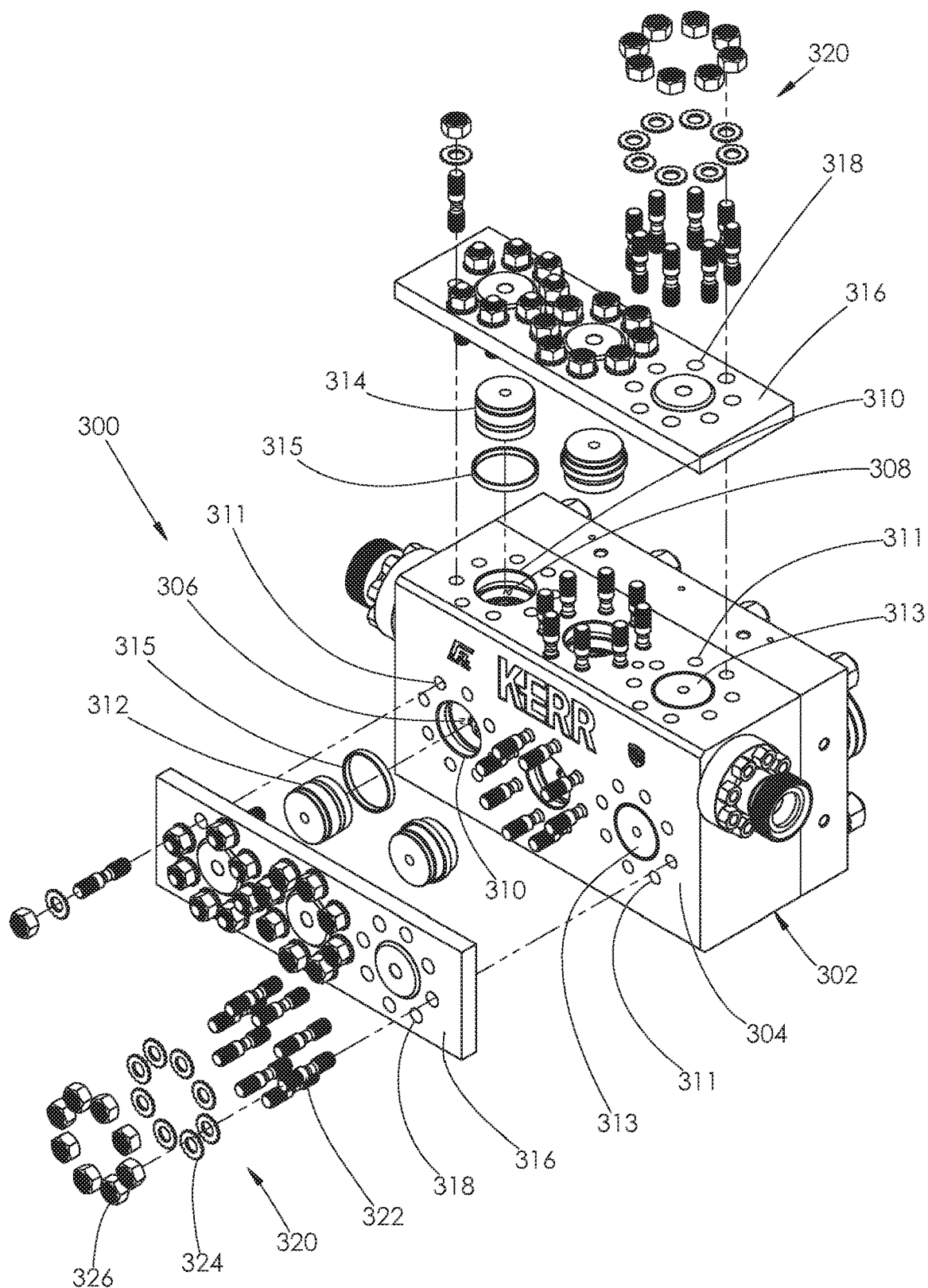
FIG. 7 is a partially exploded view of a third embodiment of a fluid end.

Turning now to FIG. 7, a third embodiment of a fluid end 300 is shown. The fluid end 300 comprises a housing or fluid end body 302 having a flat external surface 304 and a plurality of first and second bores 306, 308 formed adjacent one another therein. Each bore of each set of paired bores 306 and 308 terminates in a corresponding opening 310 formed in the external surface 304. A plurality of threaded openings 311 are formed in the body 302 and uniformly spaced around each bore opening 310. The internal functions of the fluid end 300 are identical to those described with reference to fluid end 100, shown in FIG. 3.

The fluid end 300 further comprises a plurality of sets of components 312 and 314. The number of sets preferably equals the number of set of paired first and second bores 306 and 308 formed in the body 302. The component 312 is positioned within a first bore 306, and the component 314 is positioned within its paired second bore 308. In one embodiment, the component 312 is a suction plug and the component 314 is a discharge plug. A seal 315 is positioned around each of the components 312, 314 to block fluid from leaking from the respective bores 306, 308.

The components 312 and 314 have the same shape and construction as the components 212 and 214 shown in FIGS. 4 and 6. Each of the components 312 and 314 may engage with internal seats (not shown) formed in the walls of each of the bores 306, 308. Such engagement helps prevent longitudinal movement of the components 312, 314 within the respective bores 306, 308.

Once installed within the body 302, a top surface 313 of each of the components 312, 314 may sit flush with the external surface 304 of the body 302. Each of the components 312, 314 is secured within each respective bore 306, 308 by a retainer element 316. Each of the retainer elements 316 shown in FIG. 7 is a large rectangular plate having a footprint sized to cover a plurality of adjacent bore openings 310 at one time. A plurality of openings 318 are formed in each retainer element 316 that are alignable with a corresponding one of the openings 311 in a one-to-one relationship.

Each of the retainer elements 316 is secured to the external surface 304 of the fluid end body 302 by a fastening system 320. The fastening system 320 comprises a plurality of externally threaded studs 322, a plurality of washers 324, and a plurality of internally threaded nuts 326. The fastening system 320 secures each of the retainer elements 316 on the fluid end body 302 in the same way as described with reference to the fastening system 222 used with the fluid end 200.

Because each of the retainer elements 316 is attached to the fluid end body 302 using the fastening system 320, no external threads are formed in the retainer element 316. Likewise, no internal threads are formed within the walls of each bore 306 and 308.

When the retainer elements 316 are installed on the fluid end body 302, the edges of the retainer element 316 may extend far enough so as to sit flush with the edges of the fluid end body 302. In alternative embodiments, the retainer element 316 may have different shapes or sizes. For example, the retainer element 316 may be large enough so as to cover an entire side surface of the fluid end body 302. Alternatively, the retainer elements 316 may have rounded edges, as shown in FIG. 8.

Figure 8:
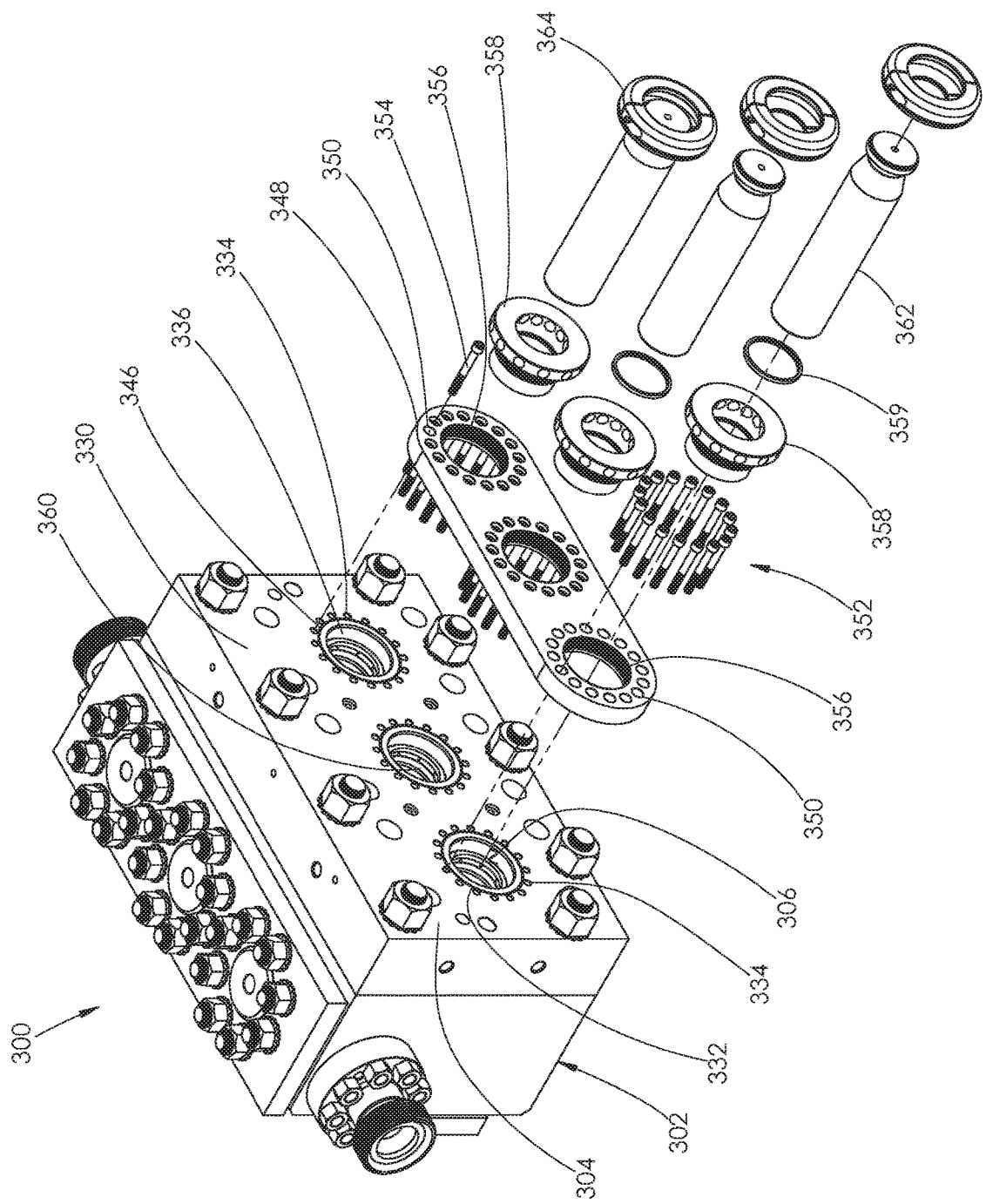
FIG. 8 is a partially exploded view of a plunger end of the fluid end body shown in FIG. 7.

Turning to FIG. 8, a plunger end 330 of the fluid end 300 is shown. The plurality of first bores 306 terminate at openings 332 formed on the external surface 304 of the plunger end 330. A plurality of internally threaded openings 334 are formed in the external surface 304 that are uniformly spaced around each bore opening 332.

A component 336 is positioned within each first bore 306 through each of the openings 332. Each of the components 336 is tubular and sized to be closely to received within each bore 306. In one embodiment, the components 336 are stuffing box sleeves. The components 336 have the same shape and construction as the components 240, shown in FIGS. 5-6.

Once installed within the body 302, a top surface 346 of each of the components 336 may sit flush with the external surface 304 of the body 302. Each of the components 336 is secured within each bore 306 by a single retainer element 348. The retainer element 348 shown in FIG. 8 is a large oval plate having a footprint sized to cover a plurality of adjacent bore openings 332 formed on the plunger end 330 of the fluid end body 302. A plurality of openings 350 are formed in the retainer element 348 that are alignable with a corresponding one of the openings 334 in a one-to-one relationship.

In alternative embodiments, the retainer element 348 may have different shapes or sizes. For example, the retainer element 348 may be large enough so as to cover an entire side surface of the fluid end body 302. Alternatively, the retainer element 348 may have squared edges, as shown in FIG. 7.

The retainer element 348 is secured to the external surface 304 of the fluid end body 302 by a fastening system 352. The fastening system 352 comprises a plurality of screws 354. The fastening system 352 secures the retainer element 348 on the fluid end body 302 in the same way as described with reference to the fastening system 260 used with the fluid end 200 and shown in FIGS. 5-6.

Because the retainer element 348 is attached to the fluid end body 302 using the fastening system 352, no external threads are formed in the retainer element 348. Likewise, no internal threads are formed within the walls of each bore 306.

A central threaded opening 356 is formed in the center of each grouping of openings 350 in the retainer element 348. The openings 356 are alignable with each bore opening 332 in a one-to-one relationship. A single packing nut 358 may thread into each central opening 356. A seal 359 may be positioned within each packing nut 358.

Similar to the plunger end 234 shown in FIGS. 5-6, a plurality of packing seals 360 may be positioned within each component 336. Each of the packing nuts 358 may compress the packing seals 360 when installed within the retainer element 348. A plurality of plungers 362 may be disposed within each component 336, the retainer element 348, and each packing nut 358. Each of the plungers 362 may be connected to a power end via a clamp 364. A cross-sectional view of the fluid end 300 looks identical to the cross-sectional view of the fluid end 200, shown in FIG. 6.

Several kits are useful for assembling the fluid end 300. A first kit comprises a plurality of the components 312 or 314, a retainer element 316, and the fastening system 320. A second kit may comprise a plurality of the components 336, a retainer element 348, and the fastening system 352. The second kit may further comprise a plurality of the packing seals 360, a plurality of the packing nuts 358, and a plurality of the plungers 362. Each of the kits may be assembled using the fluid end body 302.

Figure 9:
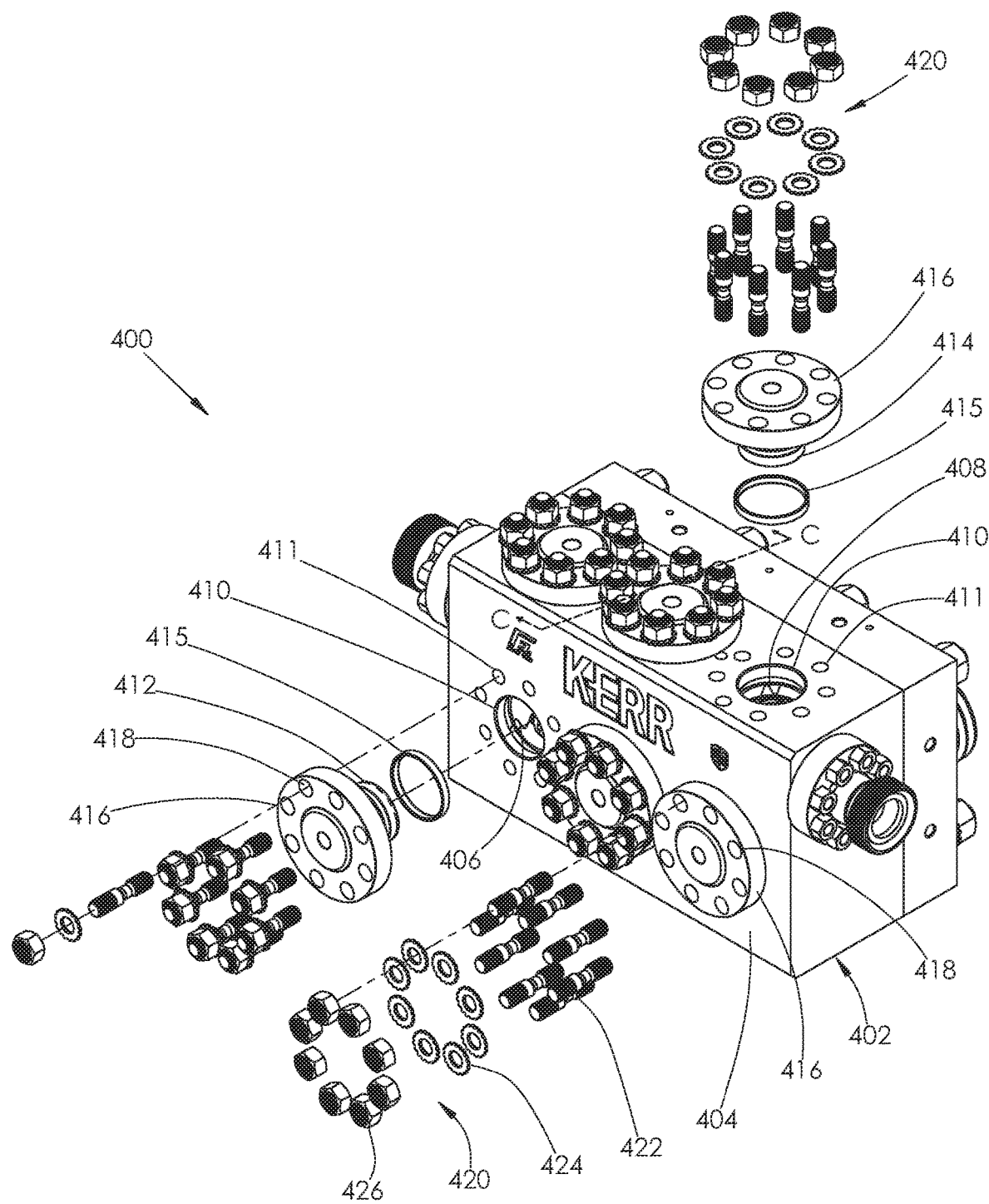
FIG. 9 is a partially exploded view of a fourth embodiment of a fluid end.
Figure 11:
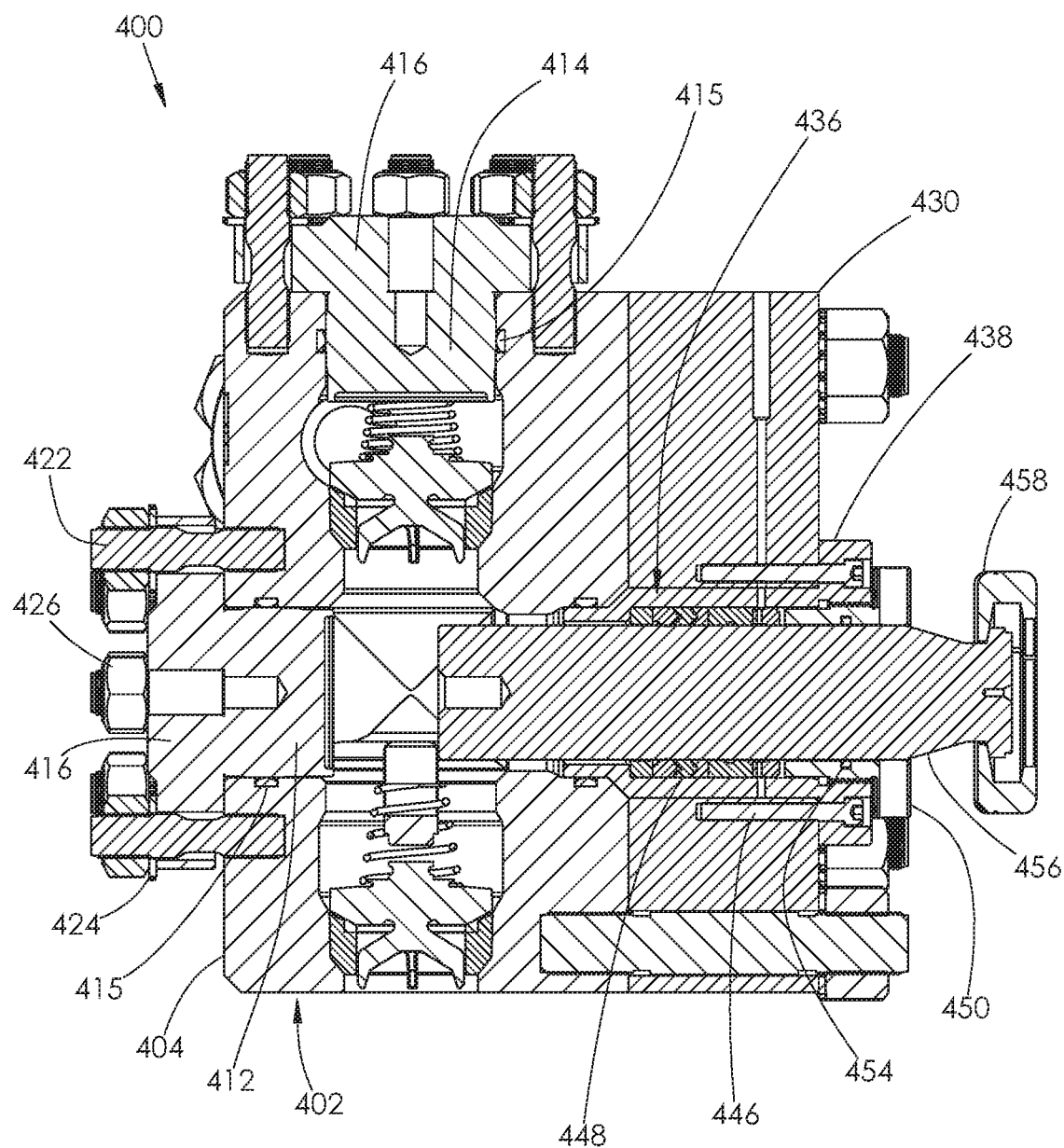
FIG. 11 is a cross-sectional view of the fluid end shown in FIG. 9, taken along line C-C.

With reference to FIGS. 9 and 11, a fourth embodiment of a fluid end 400 is shown. The fluid end 400 comprises a housing or fluid end body 402 having a flat external surface 404 and a plurality of first and second bores 406, 408 formed adjacent one another therein, as shown in FIG. 9. Each bore of each set of paired bores 406 and 408 terminates in a corresponding opening 410 formed in the external surface 404. A plurality of threaded openings 411 are formed in the body 402 and uniformly spaced around each opening 410. The internal functions of the fluid end 400 are identical to those described with reference to fluid end 100, shown in FIG. 3.

The fluid end 400 further comprises a plurality of sets of components 412 and 414. The number of sets preferably equals the number of set of paired first and second bores 406 and 408 formed in the body 402. The component 412 is positioned within a first bore 406, and the component 414 is positioned within its paired second to bore 408. In one embodiment, the component 412 is a suction plug and the component 414 is a discharge plug. A seal 415 is positioned around the outer surface of each of the components 412, 414 to block fluid from leaking from the respective bores 406, 408.

The components 412 and 414 have substantially the same shape and construction as the components 212 and 214 shown in FIGS. 4 and 6. However, in contrast to the components 212, 214, each of the components 412 and 414 is joined to a single retainer element 416.

The components 412, 414 may be welded or fastened to the center of the back surface of each retainer element 416. Alternatively, each of the components 412 or 414 and a corresponding retainer element 416 may be machined as a single piece, as shown in FIG. 11. Each of the retainer elements 416 secures each of the components 412, 414 within the respective bores 406, 408. The retainer elements 416 also prevent the components 412, 414 from moving longitudinally within the respective bores 406, 408.

A plurality of openings 418 are formed about the periphery of each retainer element 416. Each peripheral opening 418 is alignable with a corresponding one of the openings 411 in a one-to-one relationship, as shown in FIG. 9.

The retainer elements 416 are secured to the external surface 404 of the body 402 using a fastening system 420. The fastening system 420 comprises a plurality of externally threaded studs 422, a plurality of washers 424, and a plurality of internally threaded nuts 426. The fastening system 420 secures the retainer elements 416 to the fluid end body 402 in the same way as described with reference to the fastening system 222 used with the fluid end 200.

Because the retainer elements 416 are attached to the fluid end body 402 using the fastening system 420, no external threads are formed in the retainer elements 416. Likewise, no internal threads are formed within the walls of each bore 406 and 408.

Figure 10:
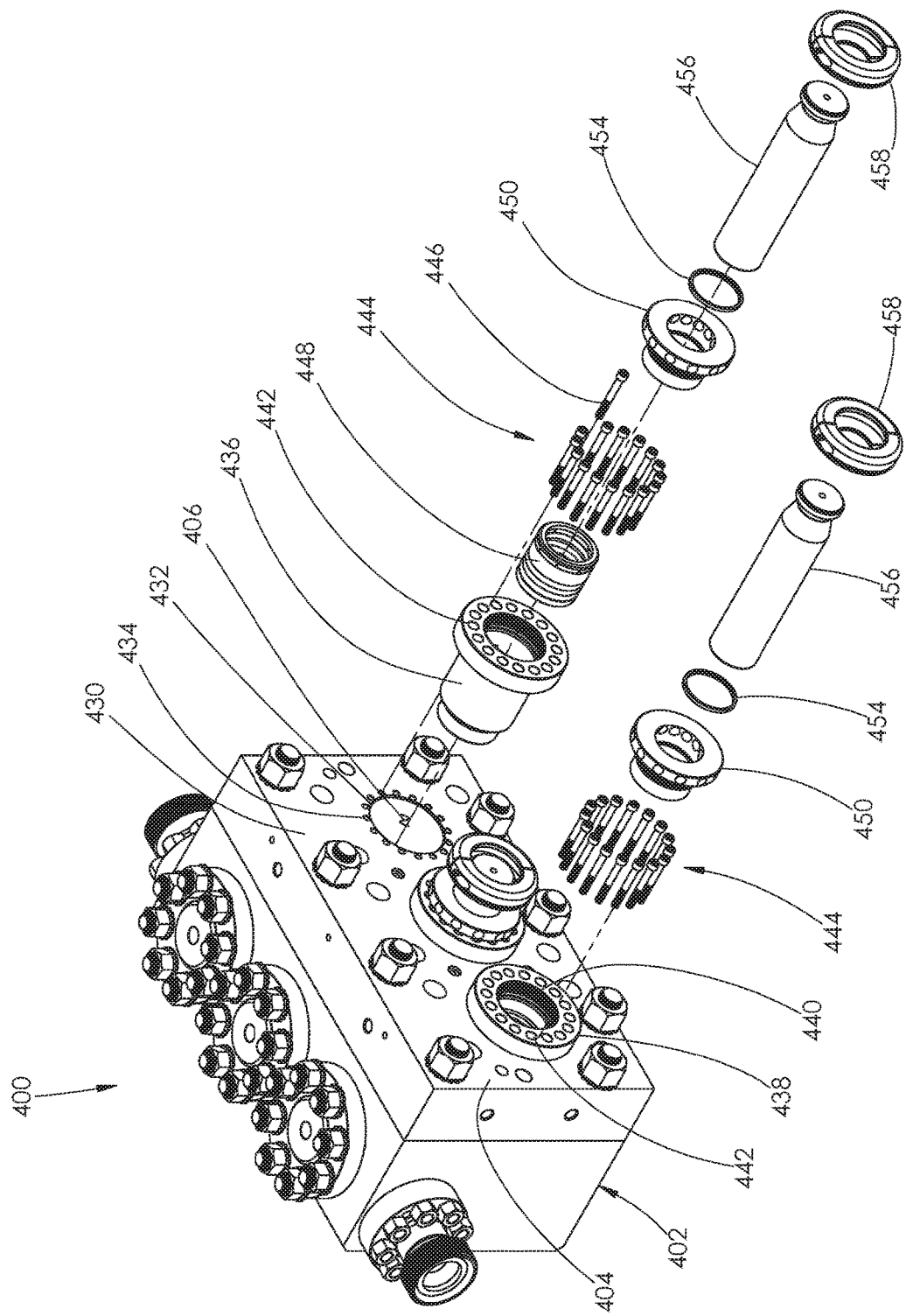
FIG. 10 is a partially exploded view of a plunger end of the fluid end body shown in FIG. 9.

Turning now to FIGS. 10-11, a plunger end 430 of the fluid end 400 is shown. The plurality of first bores 406 terminate at openings 432 formed on the external surface 404 of the plunger end 430. A plurality of internally threaded openings 434 are formed in the external surface 404 that are uniformly spaced around each bore opening 432.

A component 436 is positioned within each first bore 406 through each of the openings 432. Each of the components 436 is tubular and sized to be closely received within each bore 406. In one embodiment, the components 436 are stuffing box sleeves. The components 436 have substantially the same shape and construction as the components 240, shown in FIGS. 5-6. However, in contrast to the components 240, each of the components 436 is joined to a single retainer element 438.

The components 436 may be welded or fastened to the center of the back surface of each retainer element 438. Alternatively, each of the components 436 and a corresponding retainer element 438 may be machined as a single piece, as shown in FIG. 11. Each of the retainer elements 438 secures each of the components 436 within the bores 406. The retainer elements 438 also prevent the components 436 from moving longitudinally within the bores 406.

A threaded central opening 440 is formed within each retainer element 438. A plurality of threaded openings 442 are formed about the periphery of each of the retainer elements 438 and are uniformly spaced around each central opening 440. Each peripheral opening 442 is alignable with a corresponding one of the openings 434 in a one-to-one relationship, as shown in FIG. 10.

The retainer elements 438 are secured to the external surface 404 of the body 402 using a fastening system 444. The fastening system 444 comprises a plurality of screws 446. The fastening system 444 secures the retainer elements 438 to the fluid end body 402 in the same way as described with reference to the fastening system 260 used with the fluid end 200 and shown in FIGS. 5-6.

Because the retainer elements 438 are attached to the fluid end body 402 using the fastening system 444, no external threads are formed in the retainer elements 416. Likewise, no internal threads are formed within the walls of each bore 406 on the plunger end 430 of the body 402.

Like the plunger end 330 of fluid end 300, the fluid end 400 may also comprise a plurality of packing seals 448, a plurality of packing nuts 450, each housing a seal 454, and a plurality of plungers 456. Each plunger 456 may be connected to a power end via a clamp 458.

Several kits are useful for assembling the fluid end 400. A first kit comprises a plurality of the components 412 or 414, a plurality of the retainer elements 416, and the fastening system 420. A second kit may comprise a plurality of the components 436, a plurality of the retainer elements 438, and the fastening system 444. The second kit may further comprise a plurality of the packing seals 448, a plurality of the packing nuts 450 and a plurality of the plungers 456. Each of the kits may be assembled using the fluid end body 402.

Figure 12:
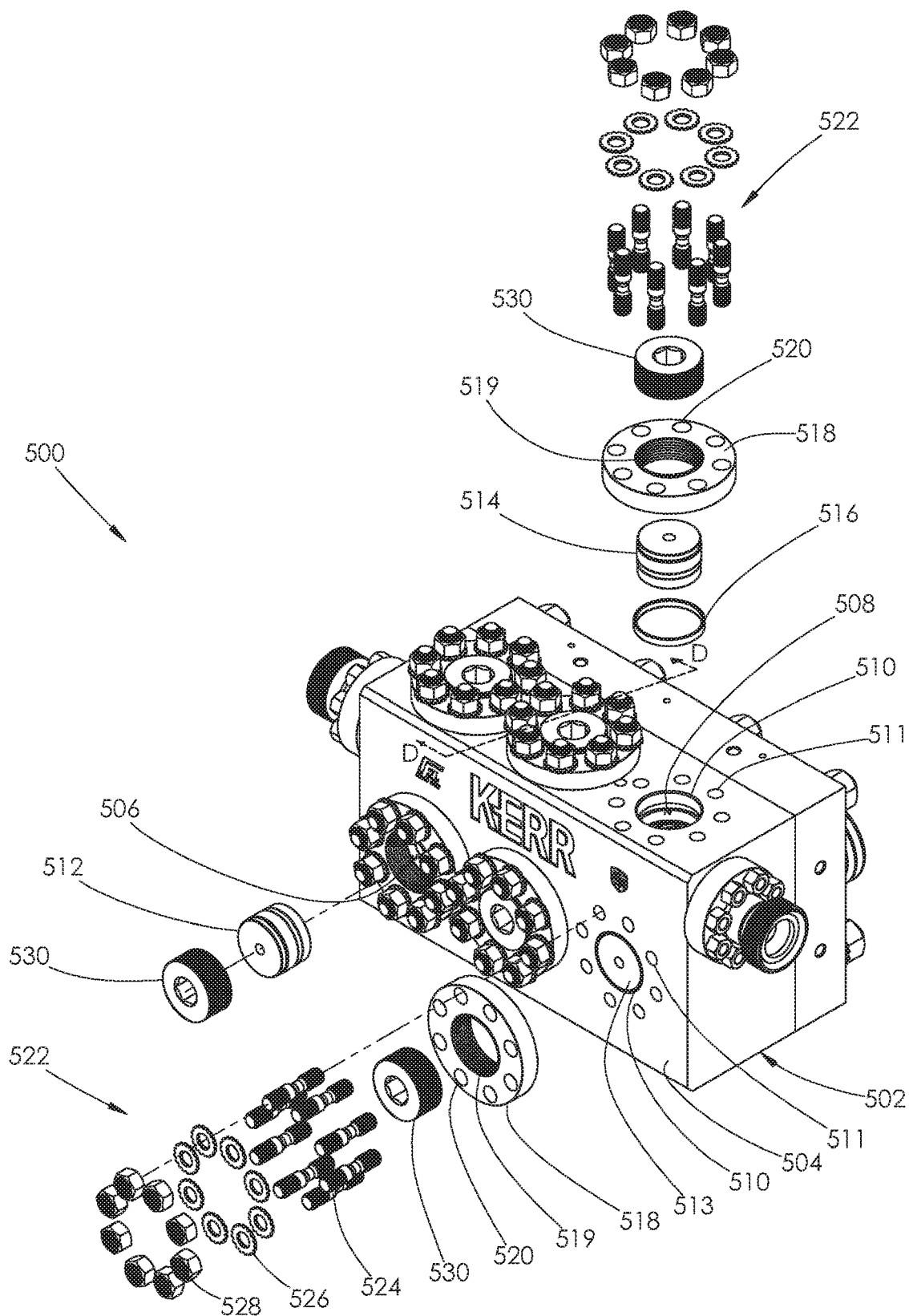
FIG. 12 is a partially exploded view of a fifth embodiment of a fluid end.
Figure 13:
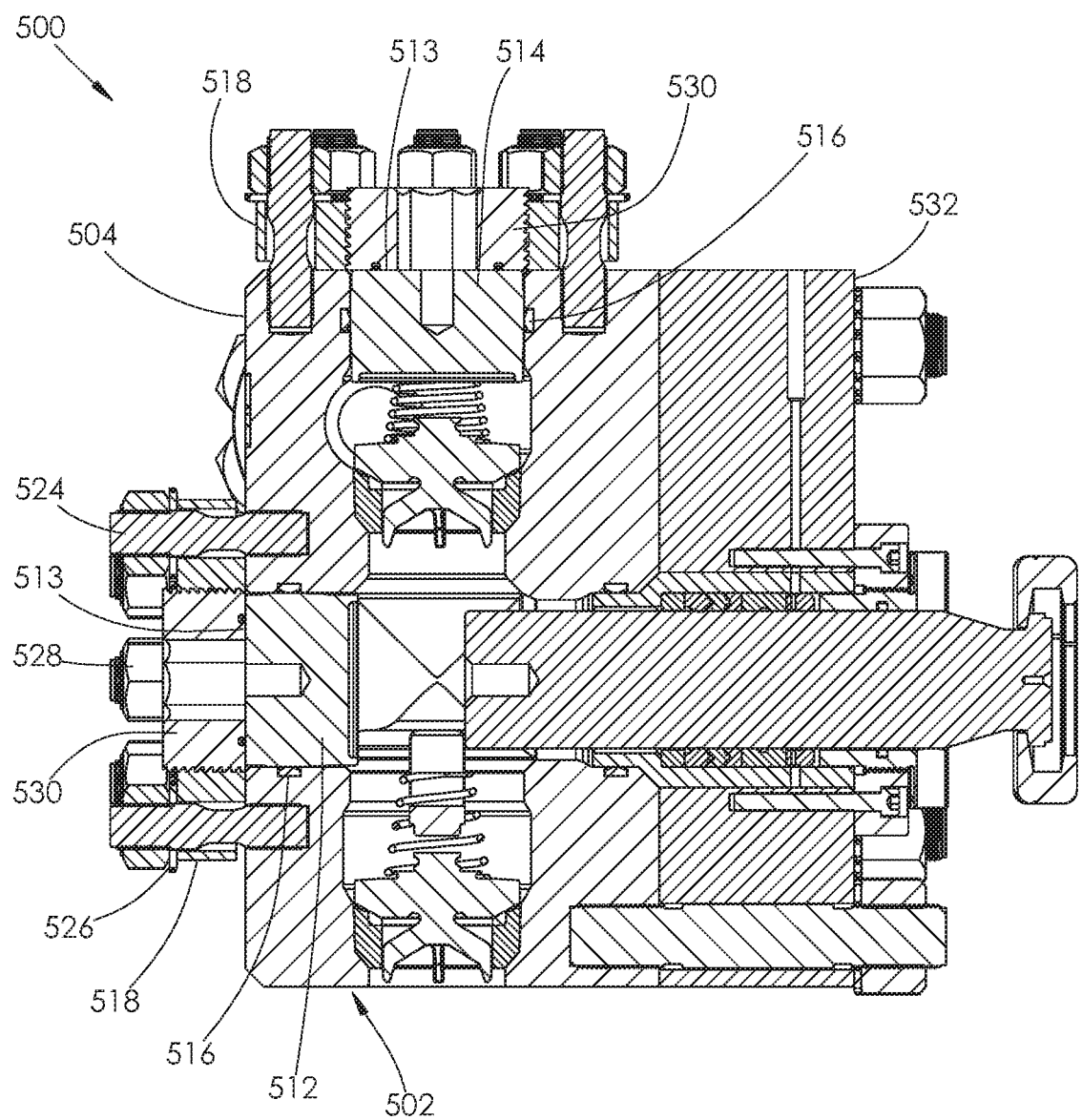
FIG. 13 is a cross-sectional view of the fluid end shown in FIG. 12, taken along line D-D.

With reference to FIGS. 12-13, a fifth embodiment of a fluid end 500 is shown. The fluid end 500 comprises a housing or fluid end body 502 having a flat external surface 504 and a plurality of first and second bores 506, 508 formed adjacent one another therein, as shown in FIG. 12. Each bore of each set of paired bores 506 and 508 terminates in a corresponding opening 510 formed in the external surface 504. A plurality of threaded openings 511 are formed in the body 502 and uniformly spaced around each opening 510. The internal functions of the fluid end 500 are identical to those described with reference to fluid end 100, shown in FIG. 3.

The fluid end 500 further comprises a plurality of sets of components 512 and 514. The number of sets preferably equals the number of set of paired first and second bores 506 and 508 formed in the body 502. The component 512 is positioned within a first bore 506, and the component 514 is positioned within its paired second bore 508. In one embodiment, the component 512 is a suction plug and the component 514 is a discharge plug. The components 512 and 514 have the same shape and construction as the components 212 and 214 shown in FIGS. 4 and 6. A seal 516 is positioned around the outer surface of each component 512, 514 to block fluid from leaking from the bores 506, 508.

As shown in FIG. 12, a top surface 513 of each of the components 512, 514 may sit flush with the external surface 504 of the body 502 when installed within a respective bore 506, 508. Each of the components 512 and 514 may engage with internal seats (not shown) formed in the walls of each of the bores 506, 508. Such engagement helps prevent longitudinal movement of the components 512, 514 within the respective bore 506, 508.

Once installed within the fluid end body 502, each component 512 and 514 is secured in place by a retainer element 518 in a one-to-one relationship. Each of the retainer elements 518 has a footprint sized to cover a single bore opening 510. The retainer elements 518 shown in FIG. 12 are flat and cylindrical and each have a central threaded opening 519. A plurality of openings 520 are formed about the periphery of each retainer element 518 and are uniformly spaced around each central opening 519. Each peripheral opening 520 is alignable with a corresponding one of the openings 511 in a one-to-one relationship, as shown in FIG. 12.

The retainer elements 518 are secured to the external surface 504 of the fluid end body 504 by a fastening system 522. The fastening system 522 comprises a plurality of externally threaded studs 524, a plurality of washers 526, and a plurality of internally threaded nuts 528. The fastening system 522 secures the retainer elements 518 to the fluid end body 502 in the same way as described with reference to the fastening system 222 used with the fluid end 200 shown in FIGS. 4 and 6.

Each central opening 519 formed in each retainer element 518 is alignable with each corresponding bore opening 510 in a one-to-one relationship. A retaining nut 530 may thread into each central opening 519 to cover each bore opening 510. Using a threaded retaining nut 530 with the retainer element 518 allows access to each bore opening 510 without having to remove the retainer elements 518 from the fluid end body 502.

While the fluid end 500 uses a threaded retaining nut 530, the retaining nut 530 is not threaded into the walls of the bores 506, 508. Thus, any failures associated with the retaining nut 530 may be experienced in the retainer element 518, which is easily replaceable. This similar configuration is used on the plunger end 234 of the fluid end 200 shown in FIGS. 5-6. Such configuration is shown again on a plunger end 532 of the fluid end body 502 in FIG. 13.

A kit is useful for assembling the fluid end 500. The kit may comprise a plurality of the components 512 or 514, a plurality of the retainer elements 518, and the fastening system 522. The kit may further comprise a plurality of retaining nuts 530. The kit may be assembled using the fluid end body 502.

Figure 14:
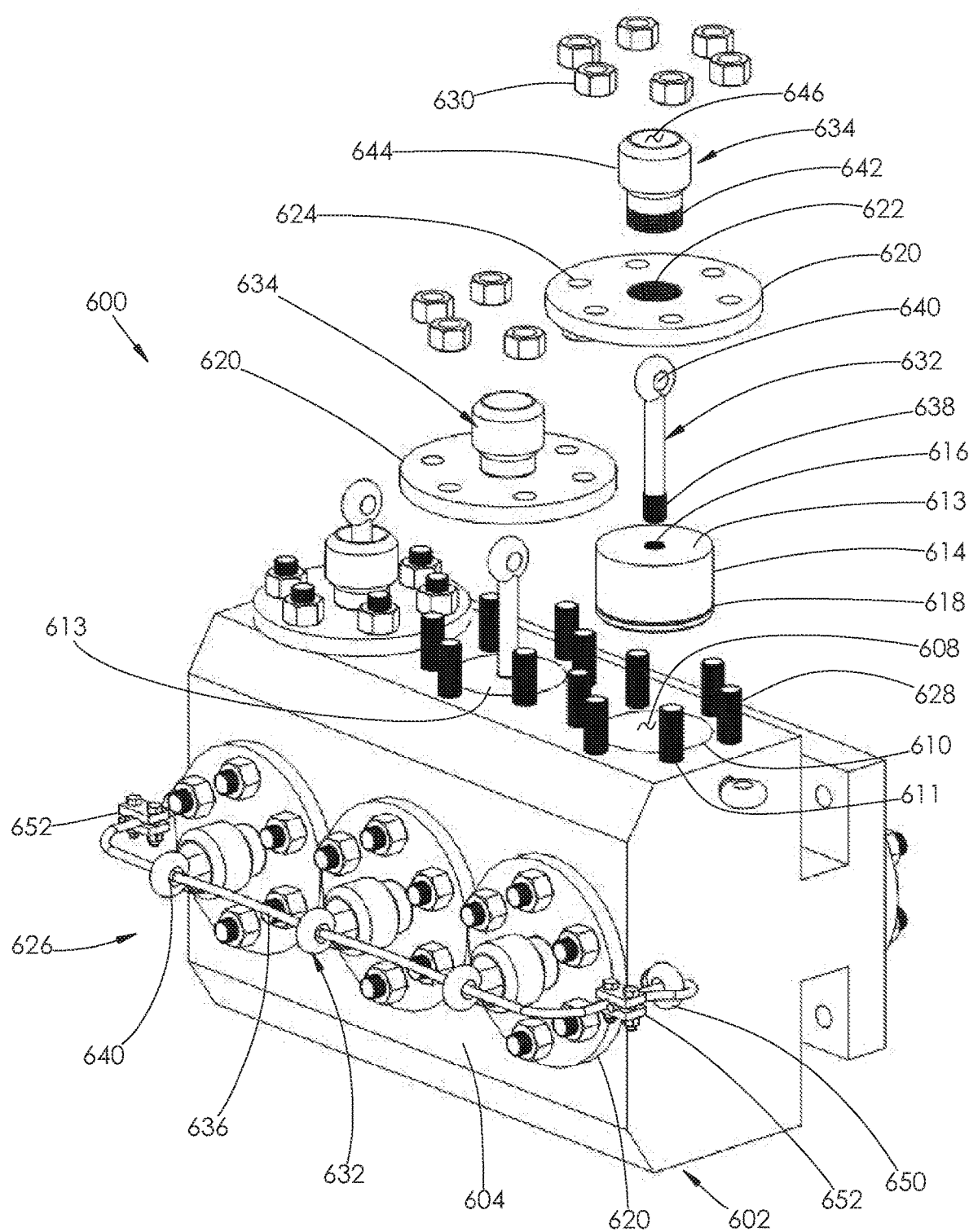
FIG. 14 is a partially exploded view of a sixth embodiment of a fluid end.

Turning now to FIG. 14, a sixth embodiment of a fluid end 600 is shown. The fluid end 600 comprises a housing or fluid end body 602 having a flat external surface 604 and a plurality of first bores (not shown) and second bores 608 formed adjacent one another therein. Each bore of each set of paired bores terminates in a corresponding opening 610 formed in the external surface 604. A plurality of threaded openings 611 are formed in the body 602 and uniformly spaced around each opening 610. The internal functions of the fluid end 600 are identical to those described with reference to fluid end 100, shown in FIG. 3.

The fluid end 600 further comprises a plurality of sets of components 614. The component 614 is positioned within a second bore 608. The components positioned within each first bore are not shown in FIG. 14. However, such components are identical in shape and construction to the components 614.

The number of sets of components preferably equals the number of set of paired first bores (not shown) and second bores 608 formed in the body 602. In one embodiment, the component positioned within a first bore is a suction plug, and the component 614 is positioned within its paired second bore 608 is a discharge plug. The components 614 have a substantially similar shape and construction as the components 212 and 214 shown in FIGS. 4 and 6, except that a threaded hole 616 is formed in a top surface 613 of each component 614. A seal 618 is positioned around the outer surface of each component 614 to block fluid from leaking from the bores 608.

The top surface 613 of each component 614 may sit flush with the external surface 604 of the body 602 when installed within a bore 608. Each of the components 614 may engage with internal seats (not shown) formed in the walls of each of the bores 608. This engagement helps prevent longitudinal movement of the components 614 within the bore 608. Likewise, the components positioned within the first bores (not shown) may engage internal seats formed within the walls of the first bores.

Once installed within the fluid end body 602, each component 614 is secured by a retainer element 620 in a one-to-one relationship. Likewise, the components positioned within the first bores (not shown) are each secured by one of the retainer elements 620. Each of the retainer elements 620 has a footprint sized to cover a single bore opening 610. The retainer elements 620 shown in FIG. 14 are flat and cylindrical and each have a central threaded opening 622. A plurality of openings 624 are formed about the periphery of each retainer element 620 and are uniformly spaced around each central opening 622. Each peripheral opening 624 is alignable with a corresponding one of the openings 611 in a one-to-one relationship.

The retainer elements 620 are secured to the external surface 604 of the fluid end body 602 by a fastening system 626. The fastening system 626 comprises a plurality of externally threaded studs 628, a plurality of washers (not shown), and a plurality of internally threaded nuts 630. The fastening system 626 secures the retainer elements 620 to the fluid end body 602 in the same way as described with reference to the fastening system 222 used with the fluid end 200 shown in FIGS. 4 and 6.

The fastening system 626 may further comprise a plurality of eye bolts 632, a plurality of handles 634, and a cable 636. Each eye bolt 632 has external threads 638 formed on its first end and an eye 640 formed on as opposite second end. The threaded end 638 of each eye bolt 632 threads into each hole 616 formed in each component 614 in a one-to-one relationship. Once installed within each hole 614, the eye 640 of each eyebolt 632 projects through the central opening 622 formed in each retainer element 620.

Each of the handles 634 has a threaded section 642 joined to a cylindrical body 644. A central passage 646 extends through the threaded section 642 and the body 644. Each of the threaded sections 642 may be installed within the central opening 622 of each of the retainer elements 620 such that each eye bolt 632 is disposed within the central passage 646. Once one of the handles 634 is installed in a retainer element 620, the eye boll 632 projects from the handle 634. The handle 634 helps support the eye bolt 632 and provides a grip to assist in installation or removal of a retainer element 620 on the fluid end body 602.

The cable 636 may be disposed through each eye 640 of each eye bolt 632. Each of the eye bolts 632 may be oriented to facilitate the passage of the cable 636 through each eye 640. The ends of the cable 636 may be attached to the external surface 604 of the fluid end body 602 using eye bolts 650 and clamps 652. The cable 636 is preferably made of a stiff and tough material, such as high-strength nylon or steel.

In operation, the eyebolts 632 and cable 636 tether each of the retaining elements 620 and components 614, in case of failure of the retainer elements 620, a portion of the fastening system 626, or the fluid end body 602. When a failure occurs, the large pressure in the fluid end body 602 will tend to force the components 614 out of their respective bores 608 with a large amount of energy. The cable 636 helps to retain the components 614 within the bores 608 in the event of a failure. The cable 636 also helps to retain the retainer elements 620 in position in the event of a failure. The fastening systems 134, 222, 320, 420, and 522 used with fluid ends 100, 200, 300, 400, and 500 may also be configured for use with the eye bolts 632, handles 634 and cable 636.

In alternative embodiments, the handles 634 may not be used. A single eye bolt 632 may also be formed integral with a single component 614. A single cable 636 array also be used through each of the eyebolts 632. Each cable 636 would independently attach to the external surface 604 of the fluid end body 602.

Several kits are useful for assembling the fluid end 600. A first kit comprises a plurality of the components 614, a plurality of the retainer elements 620, and the fastening system 626. The kit may be assembled using the fluid end body 602.

Turning to FIGS. 16-20, a seventh embodiment of the fluid end 800 is shown. The fluid end 800 comprises a housing or fluid end body 836. The fluid end 800 is similar to the fluid ends 100 and 500, shown in FIGS. 1-3, 12 and 13, with the below described exceptions.

With reference to FIGS. 19, 20, and 30-32, a component 804 installed within a suction bore 808 may also be referred to as a suction plug 804. The suction bore 808 may also be characterized as a fourth section of the horizontal conduit. Each of the suction plugs 804 comprises a cylindrical body having opposed top and bottom surfaces 816 and 818. The suction plug 804 is substantially solid with the exception of a threaded hole 820 formed in its top surface 816. The suction plug 804 includes an upper portion 822 joined to a lower portion 824 by a tapered portion 827.

The lower portion 824 has a reduced diameter relative to that of the upper portion 822. The lower portion 824 also includes a plurality of sections along its length; to the sections have several different diameters. The section of greatest diameter is situated midway along the length of the lower portion 824, and presents an external sealing surface 826. First and second sections 828 and 830 are formed on opposite sides of the sealing surface 826. Each of the sections 828 and 830 has a reduced diameter relative to that of the sealing surface 826. A third section 832 extends between the second section 830 and the bottom surface 818. The third section 832 has a reduced diameter relative to that of the second section 830.

Figure 21:
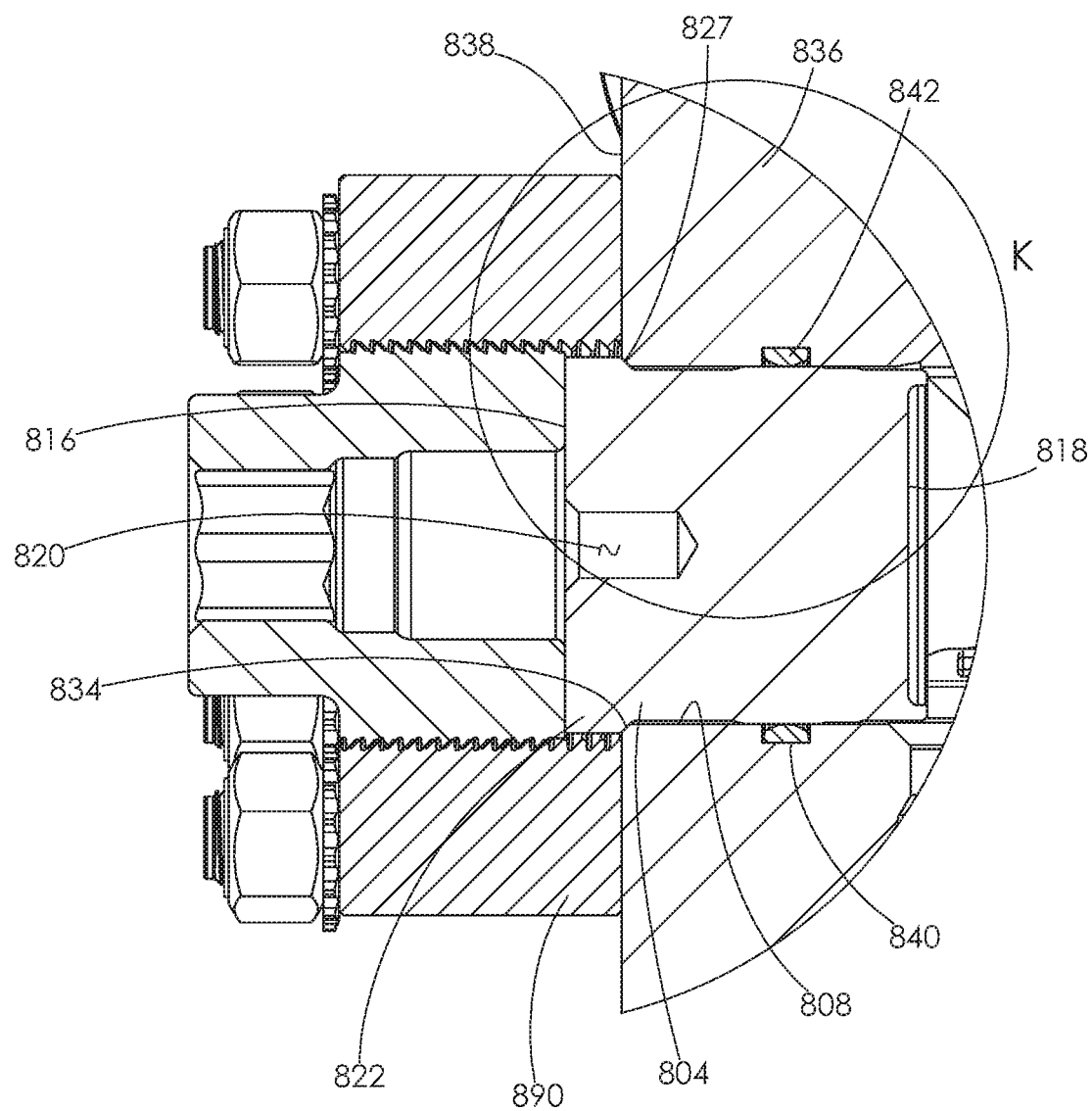
FIG. 21 is an enlarged view of area G shown in FIG. 19.

With reference to FIG. 21, a plurality of beveled corners 834 are formed in the fluid end body 836 at the intersection of a front surface 838 and the walls surrounding the opening of each suction bore 808. When a suction plug 804 is installed within one of the suction bores 808, the tapered portion 827 of the plug 804 engages the beveled corners 834. Such engagement prevents further axial movement of the plug 804 within the bore 808. The upper portion 822 of the plug 804 projects from a front surface 838 of the fluid end body 836 when installed within one of the bores 808. In alternative embodiments, the upper portion of the suction plug may engage the front surface of the fluid end body. In further alternative embodiments, axial movement of the suction plug within the bore may be prevented by engagement of the bottom surface of the plug with the walls surrounding the bore or a protrusion from the walls surrounding the bore.

Turning back to FIGS. 30-32, the outer surface of the plug 804 includes no annular recess for housing a seal. Instead, an annular recess 840 is formed in the walls surrounding each of the suction bores 808 adjacent the front surface 838 of the fluid end body 836, as shown in FIG. 21. The recess 840 is configured for housing an annular seal 842. Preferably, the seal 842 is a high pressure seal.

Figure 25:
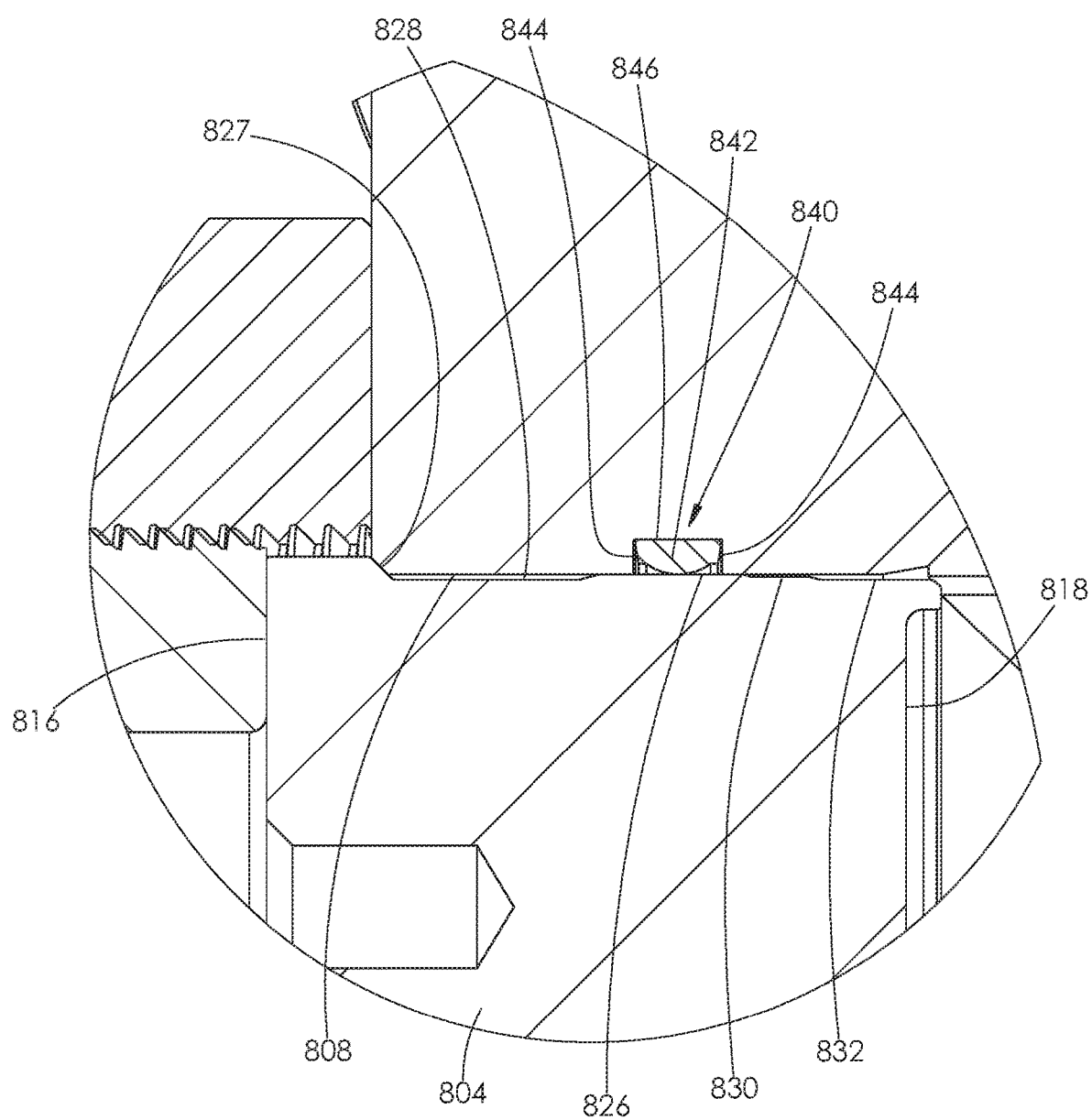
FIG. 25 is an enlarged view of area K shown in FIG. 21.

With reference to FIG. 25, each recess 840 comprises two sidewalls 844 joined by a base 846. The seal 842 is closely received within the recess 840. After a seal 842 is installed within a corresponding recess 840 within a bore 808, a suction plug 804 is installed within that bore.

When a suction plug 804 is installed within a bore 808, the seal 842 within the bore tightly engages the plug's sealing surface 826. During operation, the seal 842 wears against the sealing surface 826 of the suction plug 804. If the sealing surface 826 on one of the plugs 804 begins to erode, allowing fluid to leak around the plug 804, that plug 804 is removed and replaced with a new plug. The seal 842 may also be removed and replaced with a new seal, if needed.

Continuing with FIG. 25, a small amount of clearance exists between the walls surrounding the bore 808 and the first, second, and third sections 828, 830, and 832 of the installed plug 804. The clearance allows the suction plug 804 to rock back and forth on each side of its sealing surface 826. The rocking motion helps to overcome friction between each of the plugs 804 and the walls surrounding its corresponding bore 808. Thus, less force is required for installation or removal of one of the plugs 804 than is required for a traditional suction plug. Reduced forces mean fewer scrapes and scratches on the walls surrounding the bore, as compared to a traditional suction plug.

Figures 30, 31, 32:
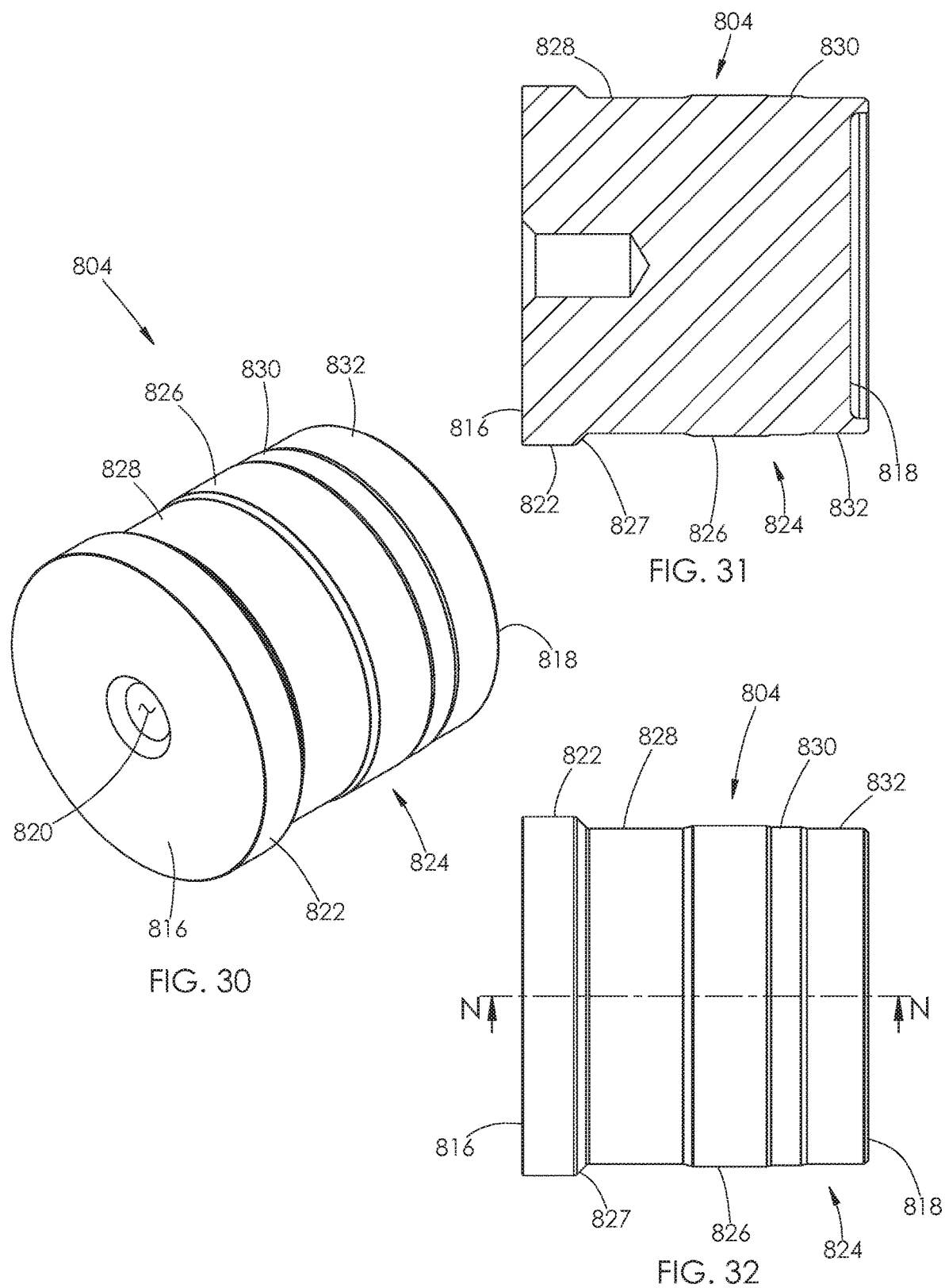
FIG. 30 is a top perspective view of a suction plug shown installed within the fluid end in FIGS. 19 and 20.
FIG. 31 is a cross-sectional view of the suction plug shown in FIG. 32, taken along line N-N.
FIG. 32 is a side elevational view of the suction plug shown in FIG. 30.

The suction plugs 804 may be installed and removed using a tool (not shown), which may be attached to a plug 804 at the threaded hole 820, shown in FIG. 30. For example, a tool having an externally threaded end may mate with the internal threads formed in the threaded hole 820. Once installed, an operator may rock the plug 804 back and forth using the tool while simultaneously pushing or pulling on the plug 804 with the tool.

Figure 19:
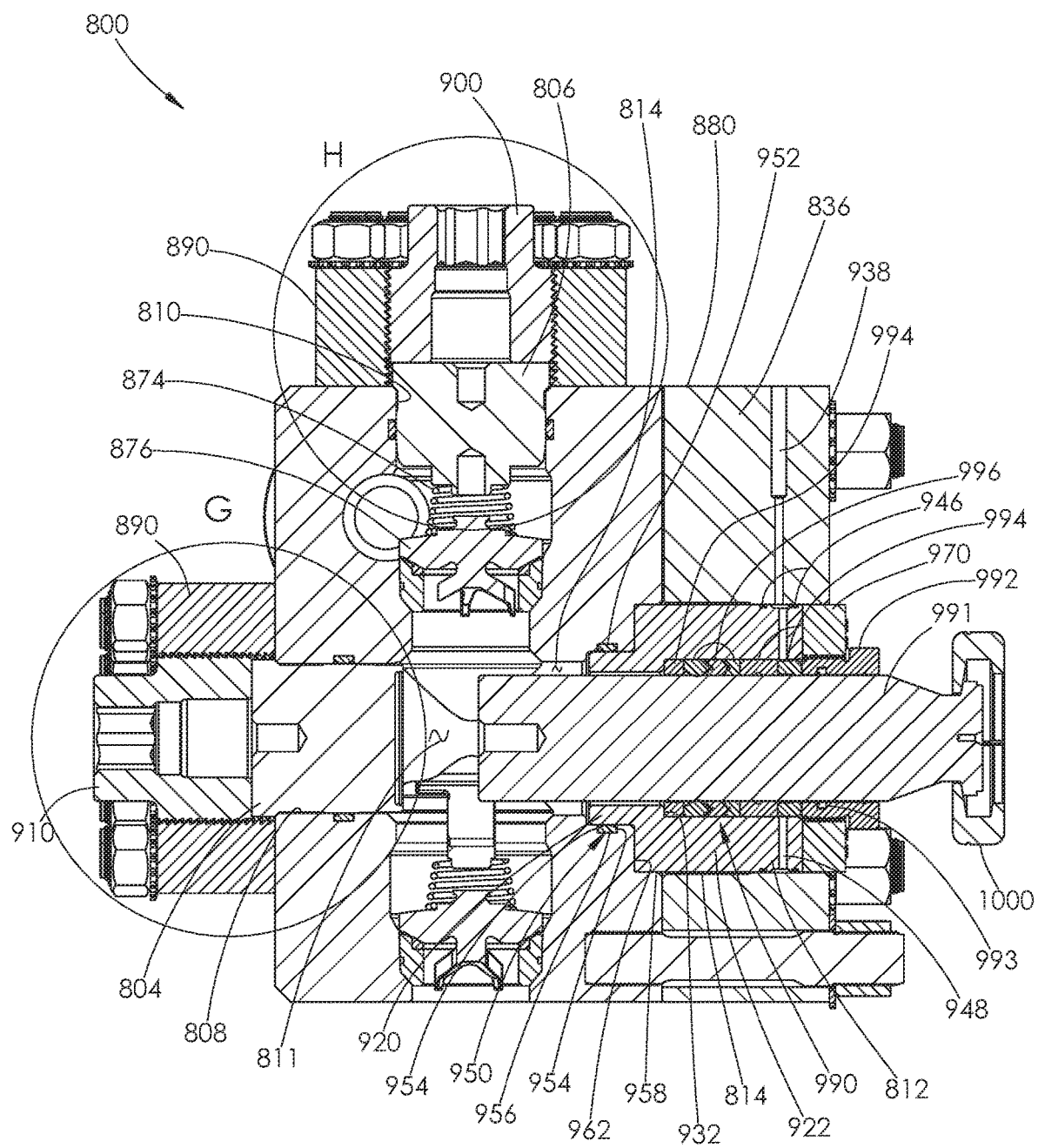
FIG. 19 is a cross-sectional view of the fluid end shown in FIG. 16, taken along line E-E.
Figure 20:
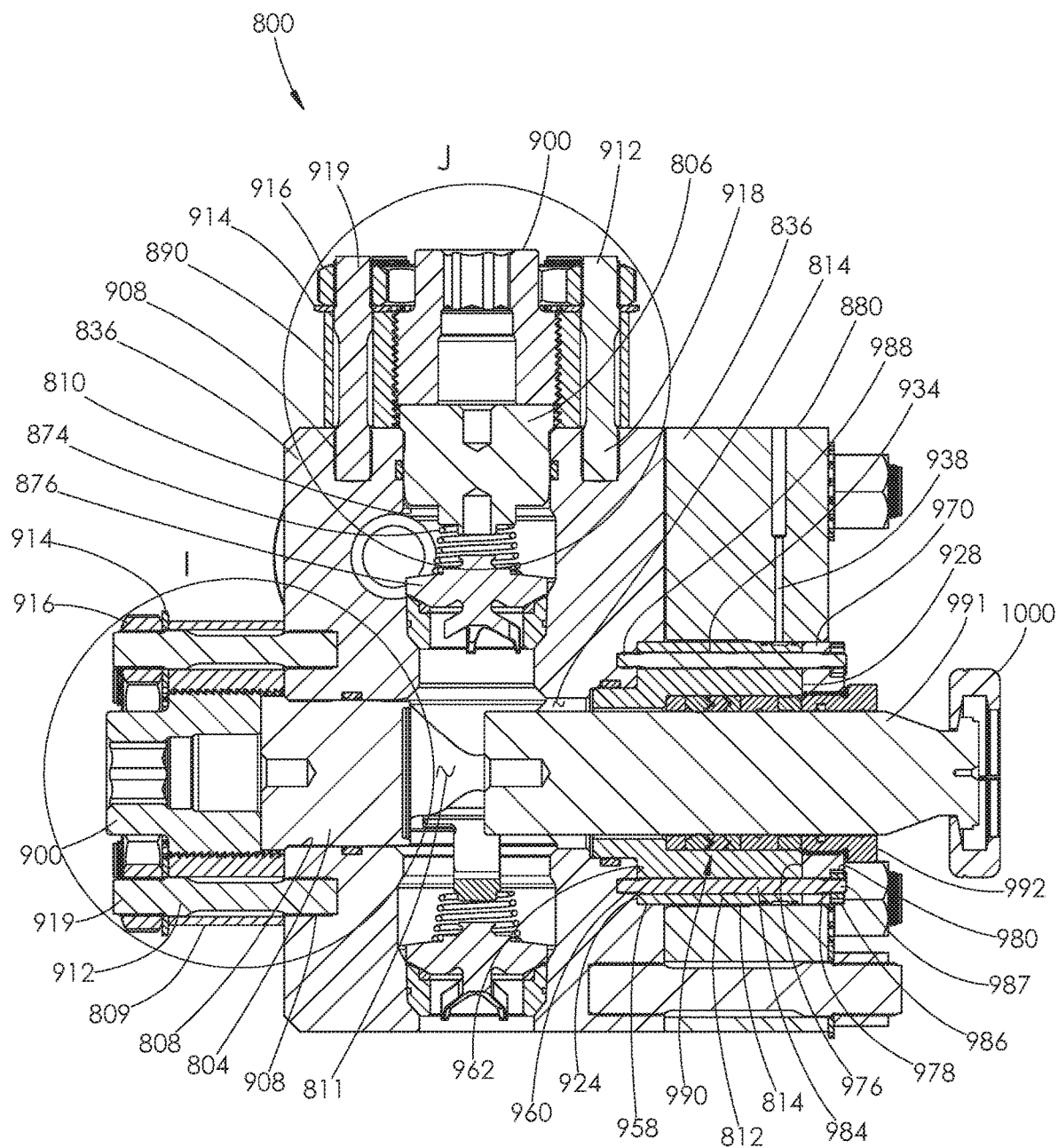
FIG. 20 is a cross-sectional view of the fluid end shown in FIG. 16, taken along line F-F.
Figures 27, 28, 29:
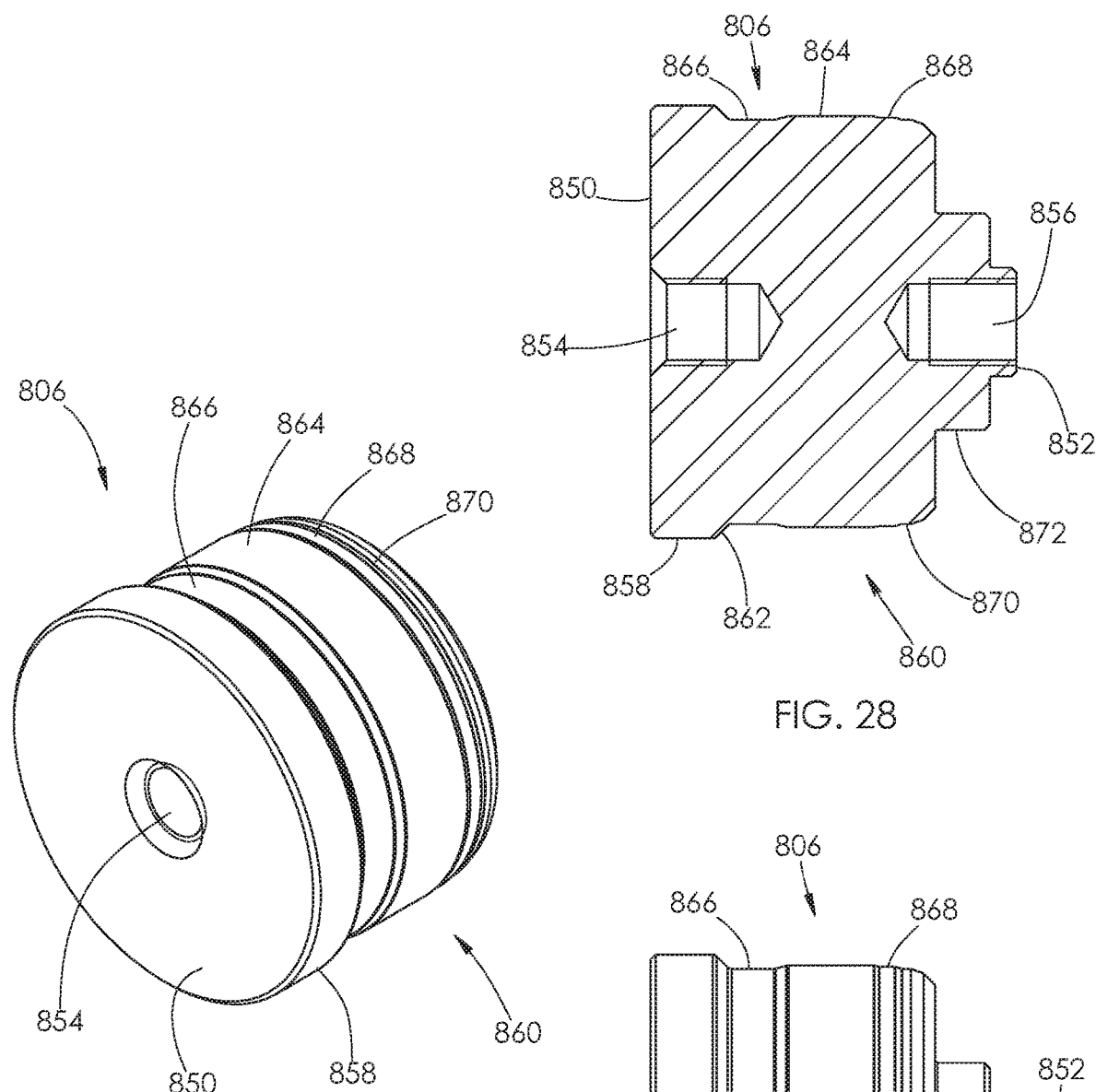
FIG. 27 is a top perspective view of a discharge plug shown installed within the fluid end in FIGS. 19 and 20.
FIG. 28 is a cross-sectional view of the discharge plug shown in FIG. 29, taken along line M-M.
FIG. 29 is a side elevational view of the discharge plug shown in FIG. 27.

Continuing with FIGS. 19 and 20, a component 806 installed within a discharge bore 810 may also be referred to as a discharge plug 806. The discharge bore 810 may also be characterized as the first section of the vertical conduit. Turning to FIGS. 27-29, each of the discharge plugs 806 comprises a cylindrical body having opposed top and bottom surfaces 850 and 852. The discharge plug 806 is substantially solid with the exception of two threaded holes. A first threaded hole 854 formed in its top surface 850 and a second threaded hole 856 formed in its bottom surface 852. Each plug 806 includes an upper portion 858 joined to a lower portion 860 by a tapered portion 862.

The lower portion 860 includes a plurality of sections along its length; the sections have several different diameters. The section of the greatest diameter is situated midway along the length of the lower portion 860, and presents an external sealing surface 864. First and second sections 866 and 868 are formed on opposite sides of the sealing surface 864. Each of the sections 866 and 868 has a reduced diameter relative to that of the sealing surface 864. A third section 870 is formed below the second section 868 and has a reduced diameter relative to that of the second section 870. The third section 870 includes a plurality of reduced diameter sections.

Each plug 806 further includes a connection portion 872. The connection portion 872 extends between the third section 870 and the bottom surface 852. The connection portion 872 has a reduced diameter relative to that of the lower portion 860. The second threaded hole 856 extends within the connection portion 872. The connection portion 872 is configured for connecting to, engaging, or aligning a spring 874 used with a discharge valve 876, shown in FIGS. 19 and 20.

Figure 22:
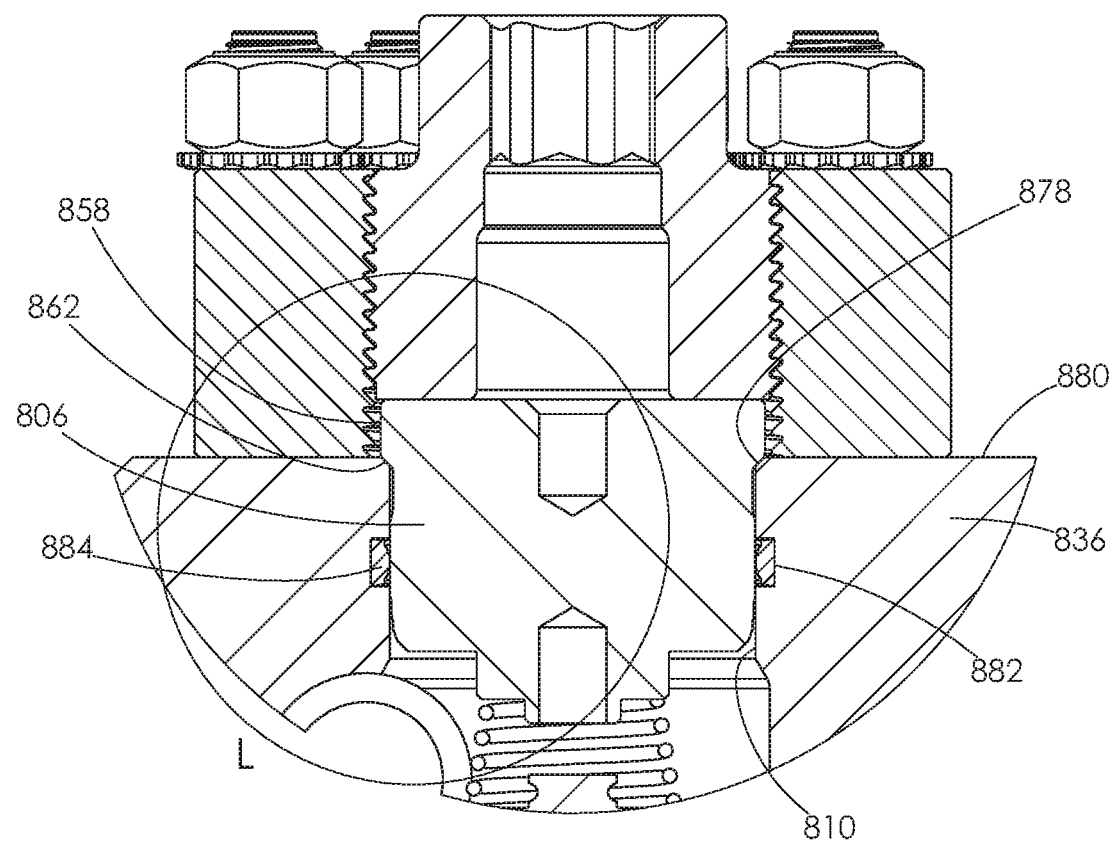
FIG. 22 is an enlarged view of area H shown in FIG. 19.

With reference to FIG. 22, a plurality of beveled corners 878 are formed in the fluid end body 836 at the intersection of the top surface 880 and the walls surrounding the opening of each discharge bore 810. When a discharge plug 806 is installed within one of the discharge bores 810, the tapered portion 862 of the plug 806 engages the beveled corners 878. Such engagement prevents further axial movement of the plug 806 within the bore 810. The upper portion 858 of the plug 806 projects from the top surface 880 of the fluid end body 836 when installed within one of the bores 810. In alternative embodiments, the upper portion of the discharge plug may engage the top surface of the fluid end body. In further alternative embodiments, axial to movement of the discharge plug within the bore may be prevented by engagement of the bottom surface of the plug with the walls surrounding the bore or protrusions from the walls surrounding the bore.

Turning back to FIGS. 27-29, the outer surface of the plug 806 includes no annular recess for housing a seal. Instead, an annular recess 882 is formed in the walls surrounding each of the discharge bores 810 adjacent the top surface 880 of the fluid end body 836, as shown in FIG. 22, The recess 882 is configured for housing an annular seal 884. Preferably, the seal 884 is a high pressure seal.

Figure 26:
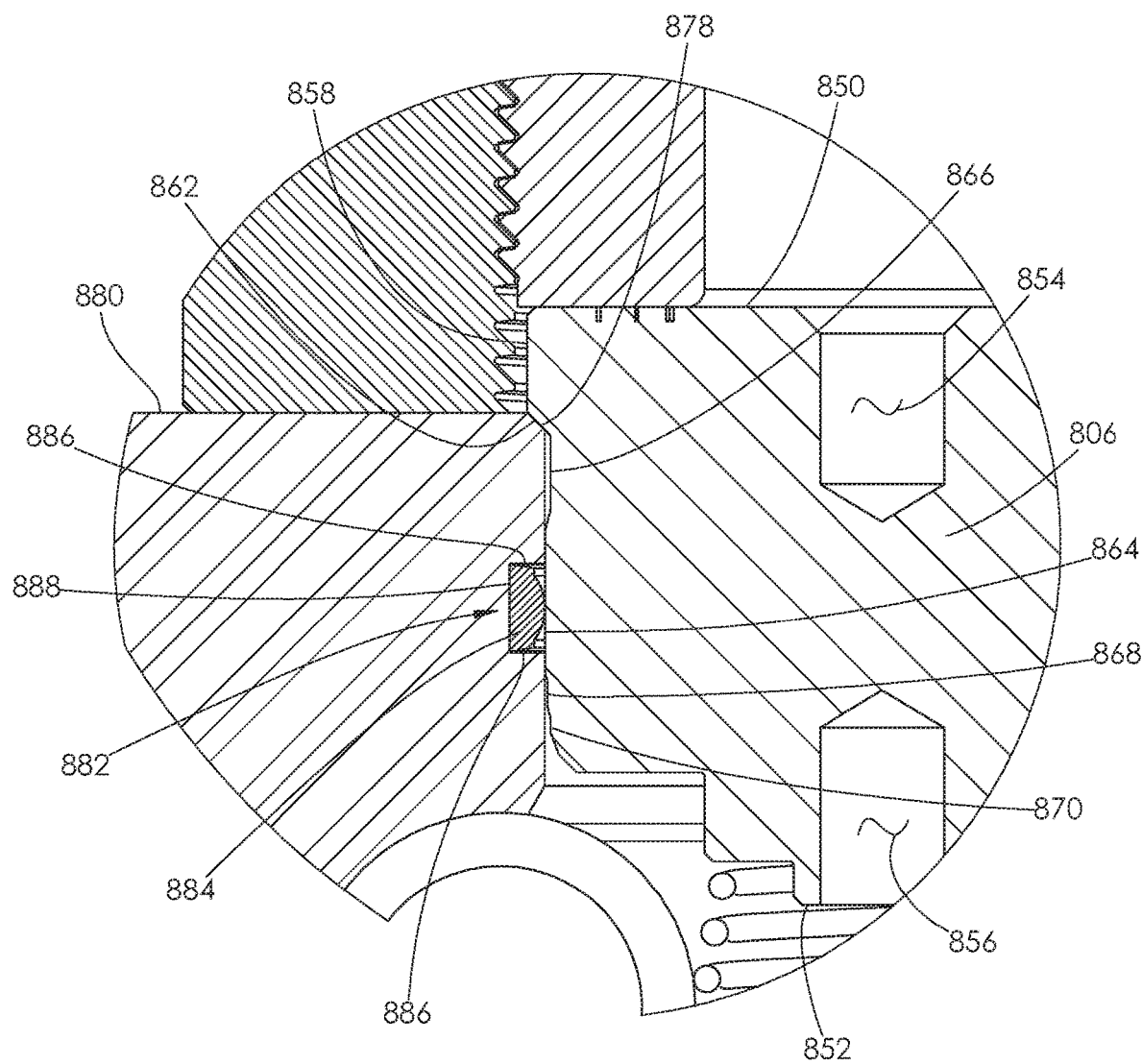
FIG. 26 is an enlarged view of area L shown in FIG. 22.

With reference to FIG. 26, each recess 882 comprises two sidewalls 886 joined by a base 888. The seal 884 is closely received within the recess 882. After a seal 884 is installed within a corresponding recess 882 within a bore 810, a discharge plug 806 is installed within that bore.

When a discharge plug 806 is installed within a bore 810, the seal 884 tightly engages the plug's sealing surface 864. During operation, the seal 884 wears against the sealing surface 864 of the discharge plug 806. If the sealing surface 864 on one of the plugs 806 begins to erode, allowing fluid to leak around the plug 806, that plug 806 is removed and replaced with a new plug. The seal 884 may also be removed and replaced with a new seal, if needed.

Continuing with FIG. 26, a small amount of clearance exists between the walls surrounding the bore 810 and the first, second, and third sections 866, 868 and 870 of the installed plug 806. The clearance allows the discharge plug 806 to rock back and forth on each side of its sealing surface 864. The rocking motion helps to overcome friction between each of the plugs 806 and the walls surrounding its corresponding bore 810. The discharge plugs 806 may be installed and removed using a tool (not shown), which may be attached to a plug 806 at the threaded hole 854, shown in FIG. 27.

With reference to FIGS. 19 and 20, when the fluid end 800 is operating, the bottom surfaces 818 and 852 of each of the plugs 804 and 806 will be exposed to the high fluid pressures within the interior of the fluid end 800. The fluid pressure may be high enough to dislodge the suction and discharge plugs 804 and 806 from their respective bores 808 and 810. To keep the plugs 804 and 806 within their respective bores 808 and 810, a plurality of retainers 890 are attached to the fluid end body 836. A retainer 890 is attached to the body 836 in front of each of the suction plugs 804 and above each of the discharge plugs 806, as shown in FIG. 20.

Figure 33:
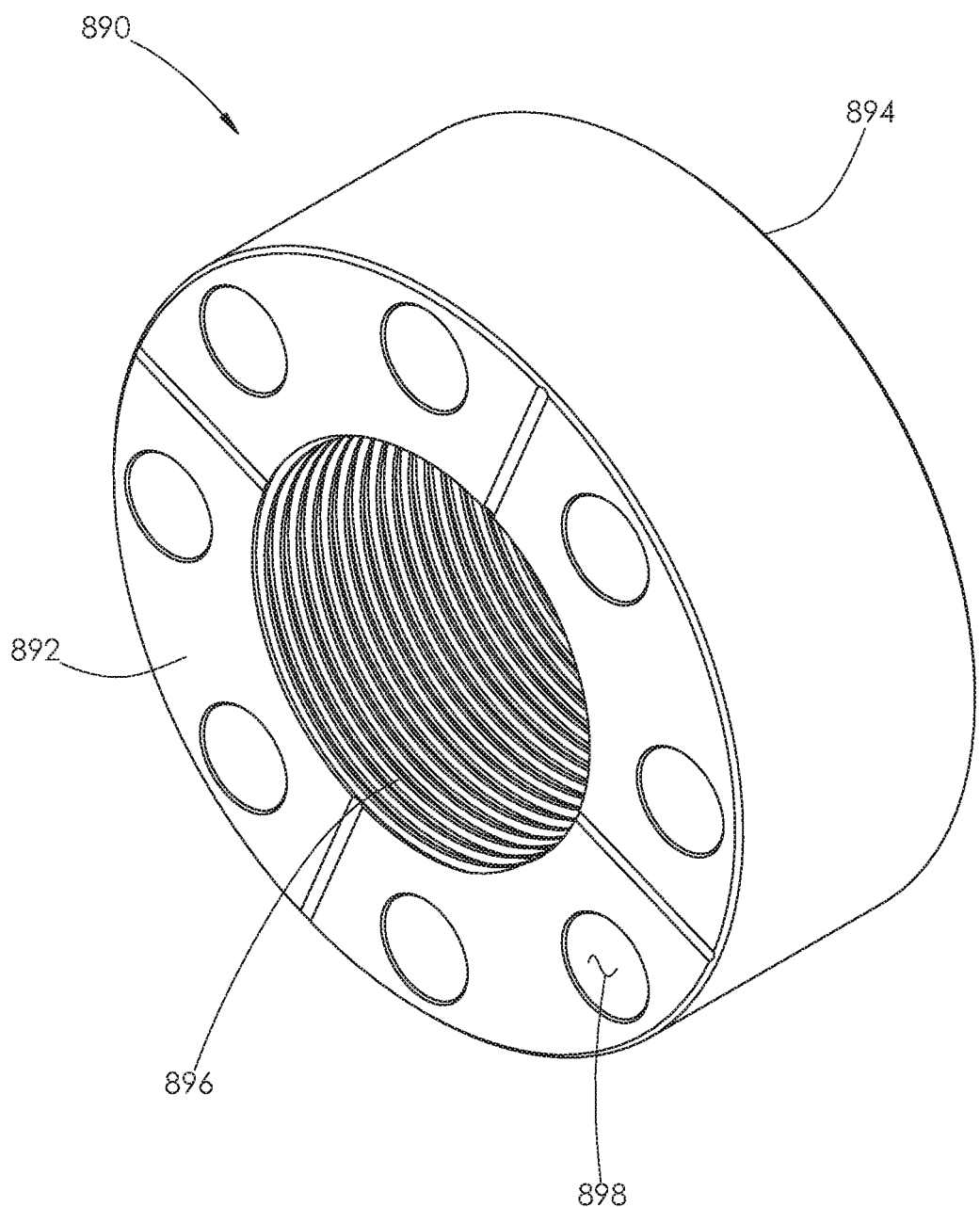
FIG. 33 is a top perspective view of a retainer shown attached to the fluid end in FIGS. 19 and 20.

With reference to FIG. 33, each retainer 890 has a cylindrical body having flat opposing top and bottom surfaces 892 and 894. A threaded central passage 896 is formed in the center of each retainer 890. The central passage 896 interconnects the top and bottom surfaces 892 and 894. A plurality of peripheral passages 898 are formed in each retainer 890 and surround the central passage 896. Each peripheral passage 898 interconnects the top and bottom surfaces 892 and 894 of each retainer 890.

Figure 34:
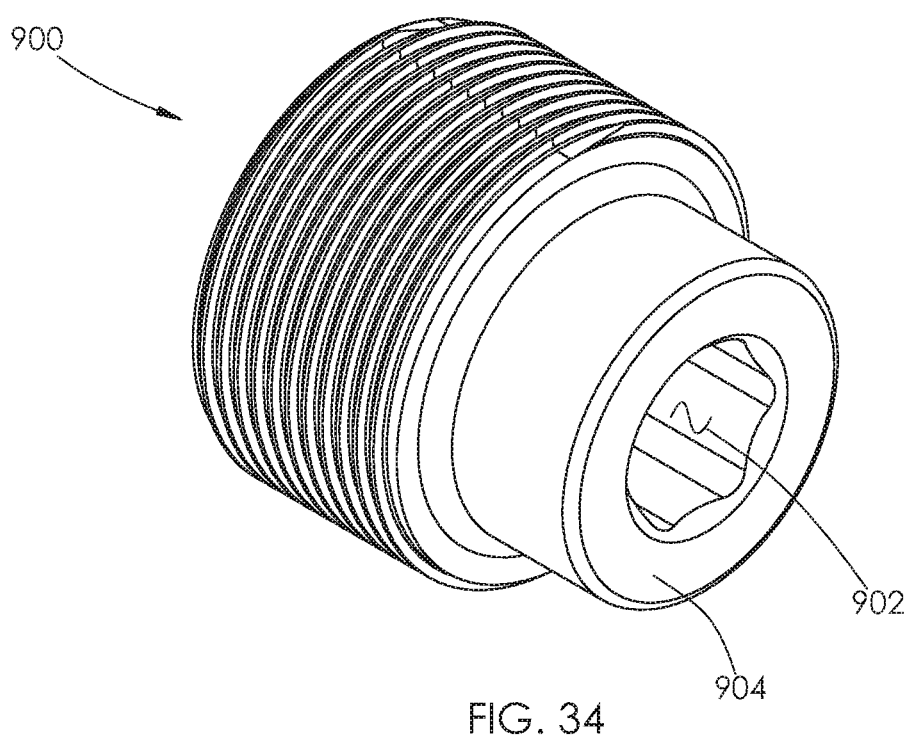
FIG. 34 is a top perspective view of a retainer nut attached to the fluid end in FIGS. 19 and 20.
Figure 35:
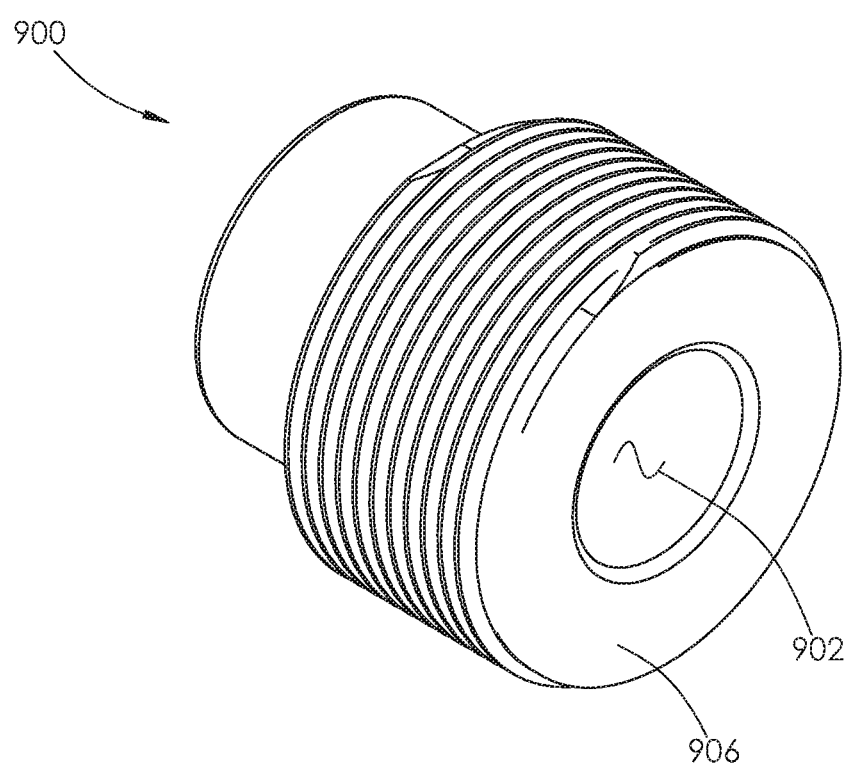
FIG. 35 is a bottom perspective view of the retainer nut shown in FIG. 34.

With reference to FIGS. 34 and 35, a retainer nut 900 is installed within the central passage 896 of each retainer 890, as shown in FIGS. 19 and 20. A central passage 902 is formed in the retainer nut 900. The central passage 902 interconnects the nut's top and bottom surfaces 904 and 906. External threads are formed on the retainer nut 900 adjacent as bottom surface 906. The external threads are matingly engageable with the internal threads formed in the retainer 890, as shown in FIGS. 19 and 20. The walls surrounding the central passage 902 adjacent the top surface 904 of the retainer nut 900 are shaped to closely receive a hex-shaped tool.

With reference to FIG. 20, a plurality of peripheral openings 908 are formed in the fluid end body 836 around each opening of each suction and discharge bore 808 and 810. The peripheral passages 908 formed in each retainer 890 are alignable with the peripheral openings 908 formed around each of the bores 808 and 810, in a one-to-one relationship.

Figure 17:
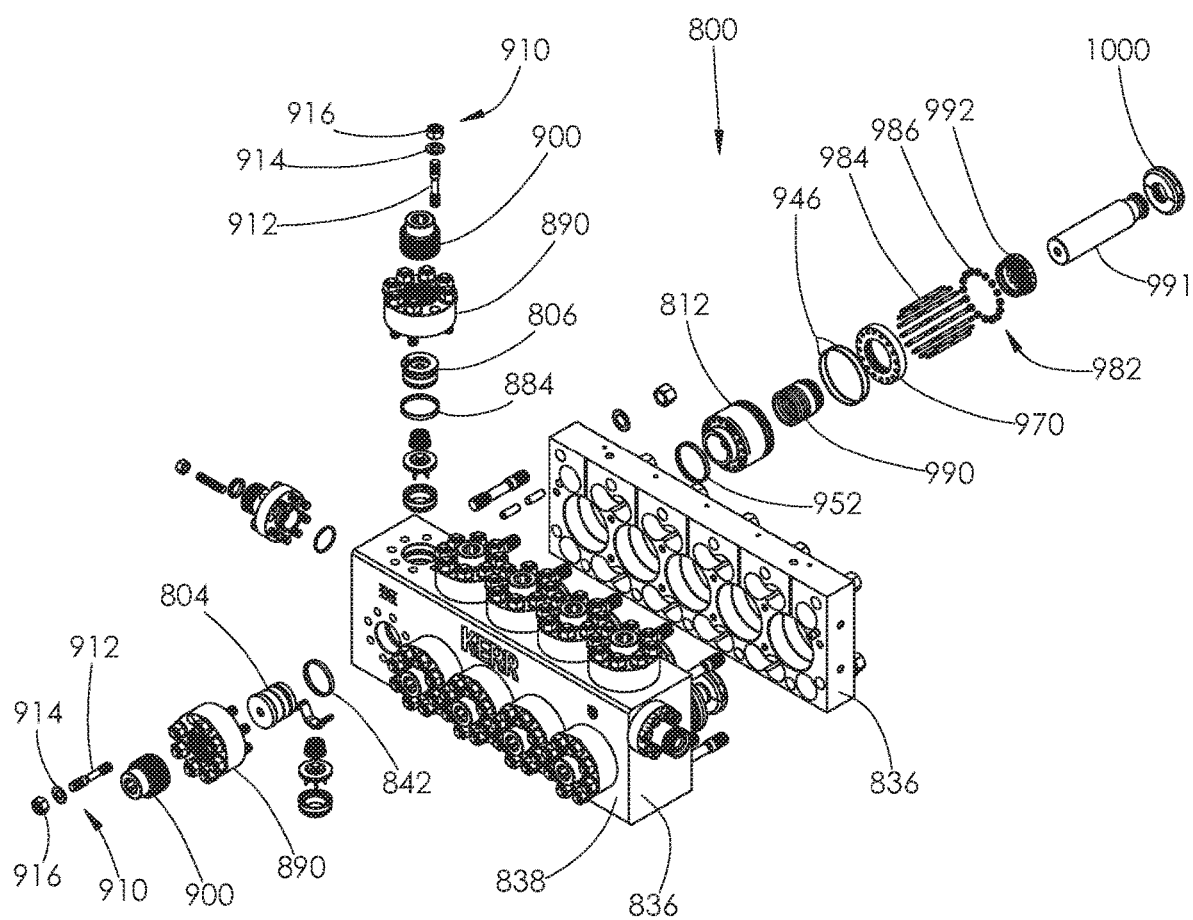
FIG. 17 is a partially exploded front perspective view of the fluid end shown in FIG. 16.
Figure 18:
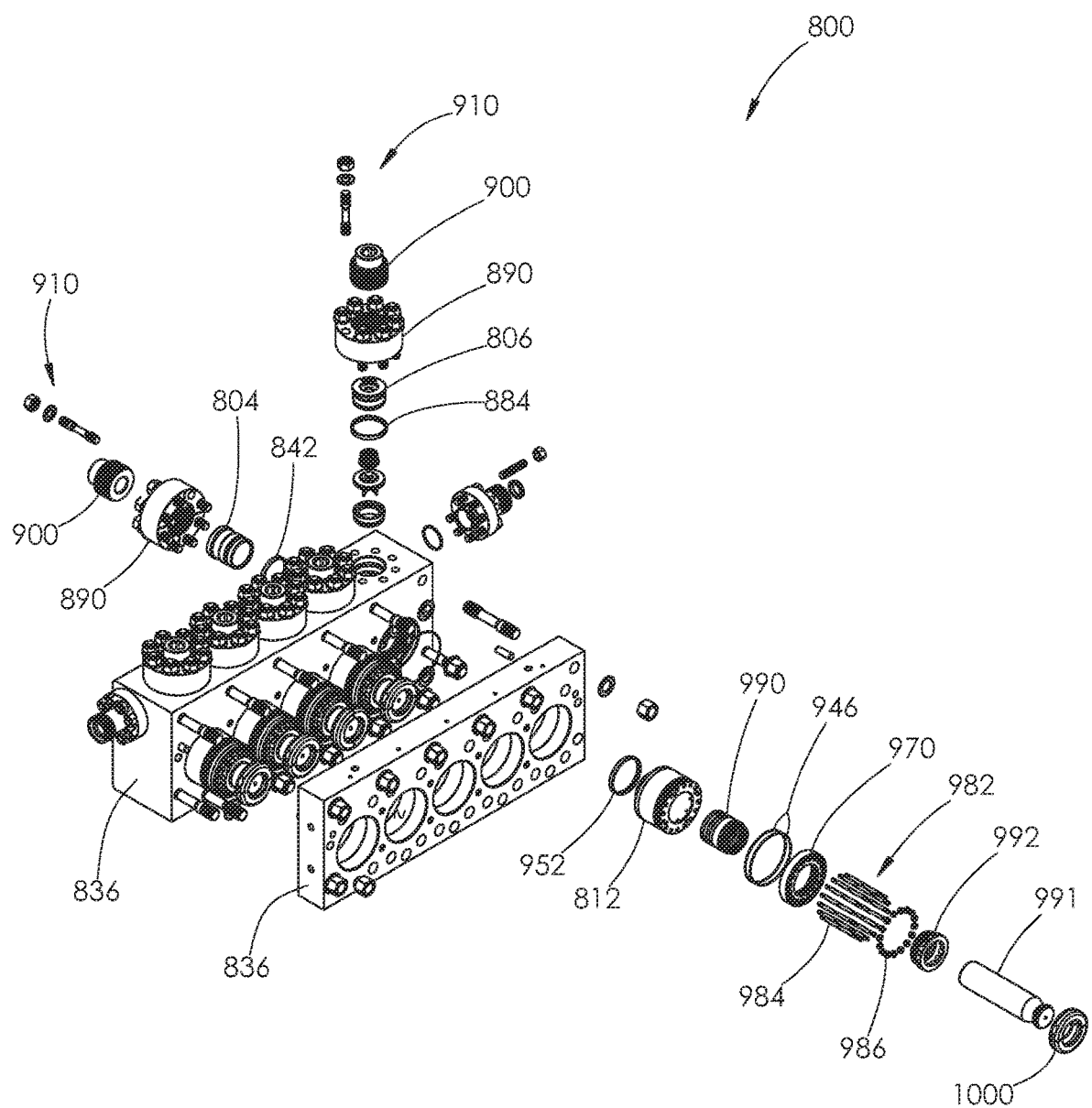
FIG. 18 is a partially exploded rear perspective view of the fluid end shown in FIG. 16.
Figure 23:
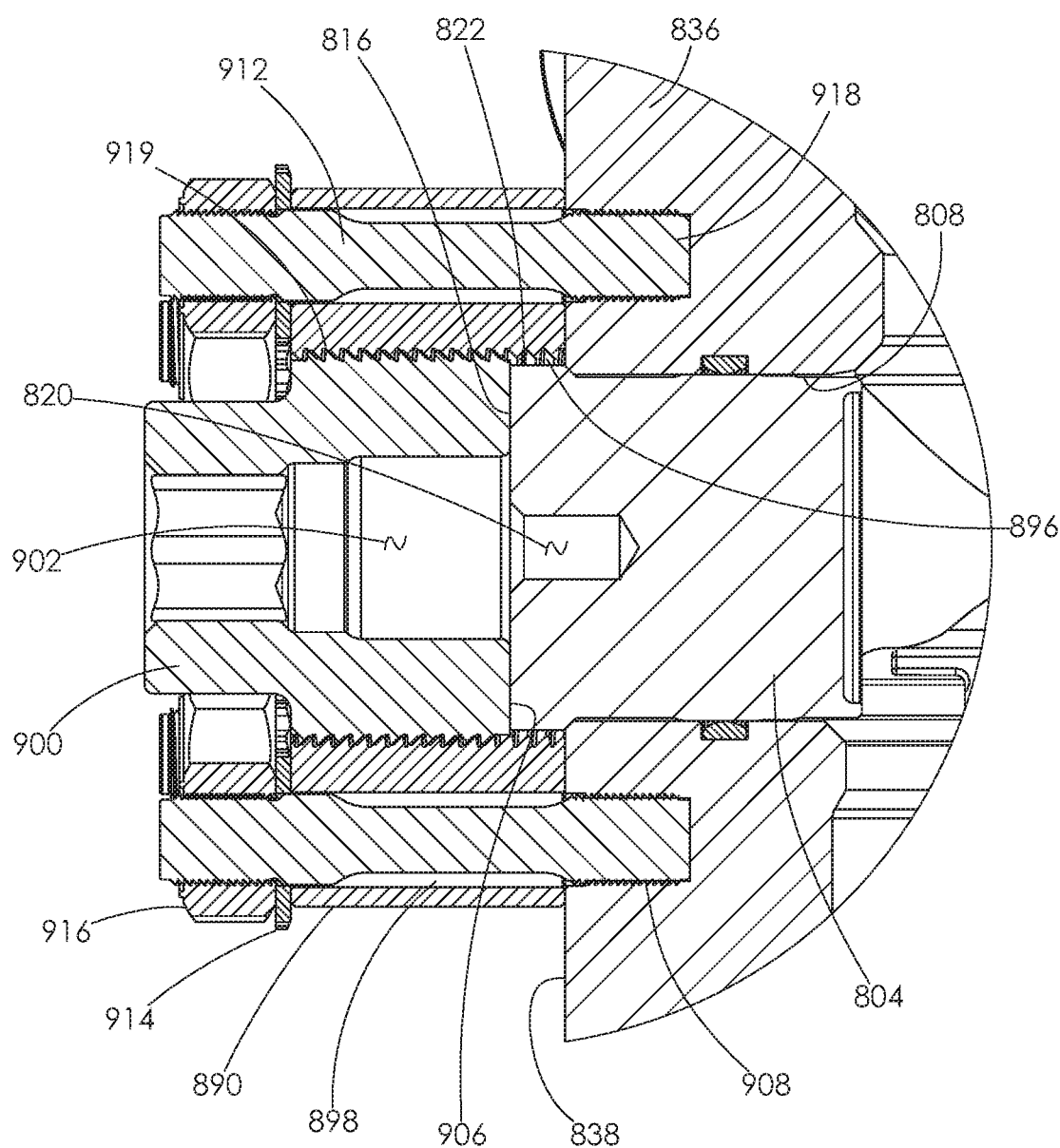
FIG. 23 is an enlarged view of area I shown in FIG. 20.
Figure 24:
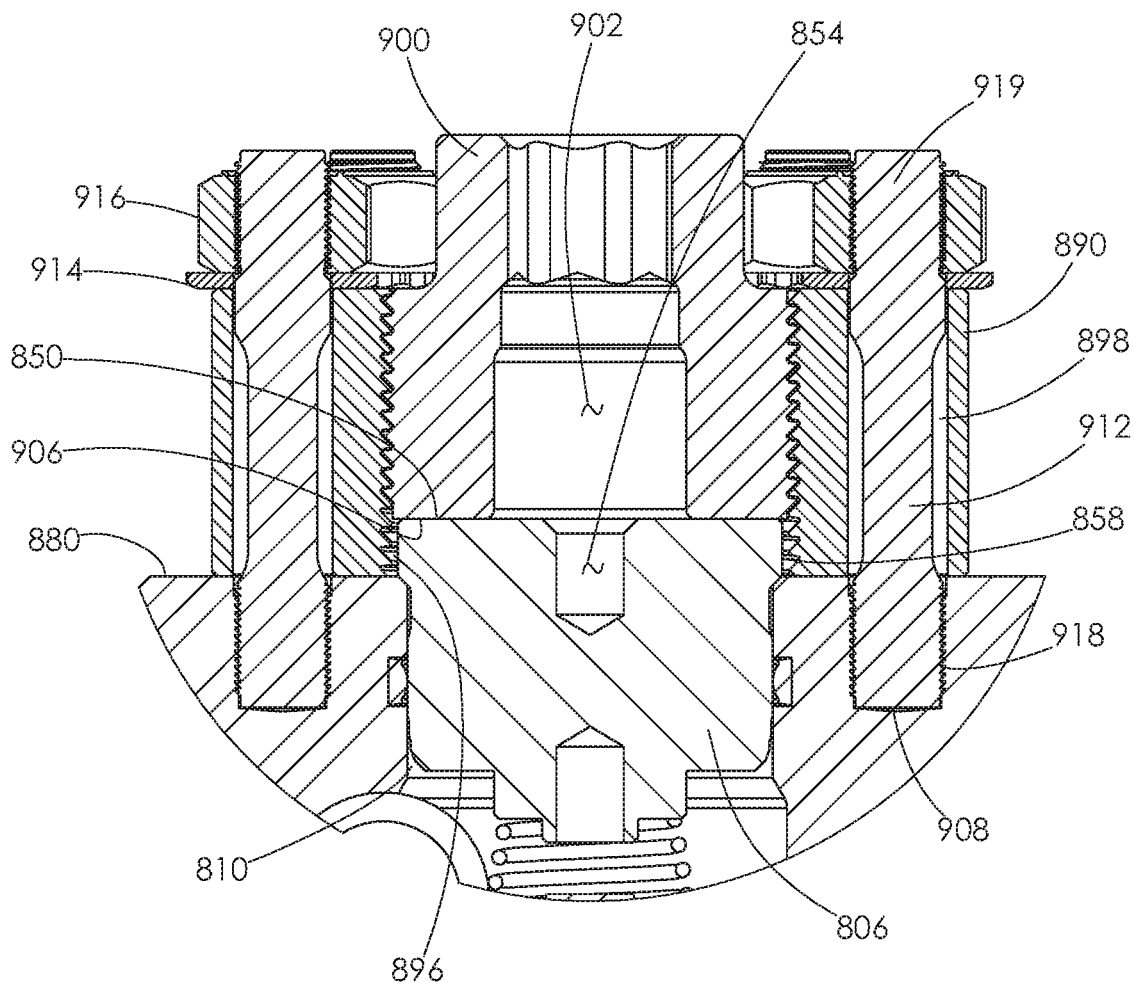
FIG. 24 is an enlarged view of area J shown in FIG. 20.

Each of the retainers 890 is secured to the fluid end body 836 using a fastening system 910, as shown in FIGS. 17 and 18. The fastening system 910 comprises a plurality of studs 912, a plurality of washers 914, and a plurality of nuts 916. Each stud 912 is externally threaded adjacent its first end 918, while each peripheral opening 908 formed in the fluid end body 836 has internal threads that mate with those of the stud 912, as shown in FIGS. 23 and 24. Studs 912 are threaded into place within each of the peripheral openings 908.

Continuing with FIGS. 23 and 24, once a first stud 912 has been installed in the fluid end body 836 at its first end 918, its opposed second end 919 projects from the body's top or front surface 880 or 838. Each peripheral passage 989 formed in each of the retainers 890 receives a corresponding one of the studs 912. Each of the studs 912 receives a washer 914 and nut 916, which hold the retainer 890 against the top and front surface 880 and 838 of the fluid end body 836. Rather than applying a single large torque to a single retainer, the fastening system 910 contemplates distribution of smaller torques among a plurality of studs 912 and nuts 916.

When a retainer 890 is attached to the fluid end body 836, the central passage 896 surrounds the upper portion 822 or 858 of the plug 804 or 806. The retainer nut 900 installed within the retainer 890 is torqued so that its bottom surface 906 tightly engages with the top surface 816 or 850 of the plug 804 or 806. Such engagement maintains the plug 804 or 806 within as corresponding bore 808 or 810. When the retainer nut 900 is engaged with the top surface 816 or 850 of the plug 804 or 806, the threaded hole 820 or 854 formed in the plug 804 or 806 is exposed to the nut's central passage 902.

During operation, an operator may need access to the inside of the fluid end 800 multiple times during a single (racking operation. For example, one of the plugs 804 or 806 may need to be replaced. Removing a retainer 890 to gain such access can be time-consuming, because of the need to remove multiple nuts 916 and washers 914.

To avoid such delays, each retainer 890 includes a removable retainer nut 900. Rather than remove all of the nuts 916 and washers 914, the operator can simply remove the retainer nut 900. When the retainer nut 900 is removed, the operator can access the interior of the fluid end body 836 through the central opening 896 of the retainer 890. The retainer nut 900 may be removed using a hex-shaped tool that mates with the walls surrounding the central passage 902 of the retainer nut 900.

While the fluid end 800 includes a plurality of threaded retainer nuts 900, those retainer nuts 900 are not threaded into the walls surrounding the bores 808 and 810. Thus, even if the threads on one of the retainer nuts 900 should crack, the fluid end body 836 remains intact. Only the retainer nut 900 and/or its corresponding retainer 890 need be replaced. The high cost of repairing or replacing the fluid end body 836 is thereby avoided.

With reference to FIGS. 19, 20, 36 and 37, a component 812 is installed within a plunger bore 814 of the fluid end 800. The plunger bore 814 may be characterized as the third section of the horizontal conduit. The component 812 may be characterized as a stuffing box 812. The stuffing box 812 has a cylindrical front portion 920 joined to a cylindrical rear potion 922. The front portion 920 has a lesser diameter than that of the rear portion 922. The stuffing box 812 is installed within the plunger bore 814 such that the front portion 920 is in front of or closer to the internal chamber 811 than the rear portion 922.

In contrast to the stuffing box sleeve 158 shown in FIG. 3, the stuffing box 812 does not include a tapered portion 164. Instead, the front portion 920 is joined directly to a front surface 924 of the rear portion 922. The stuffing box 812 is also more robust than the sleeve 158. However, one of skill in the art will recognize that the stuffing box 812 and the sleeve 158 serve the same purpose and are functionally interchangeable with one another.

Figure 36:
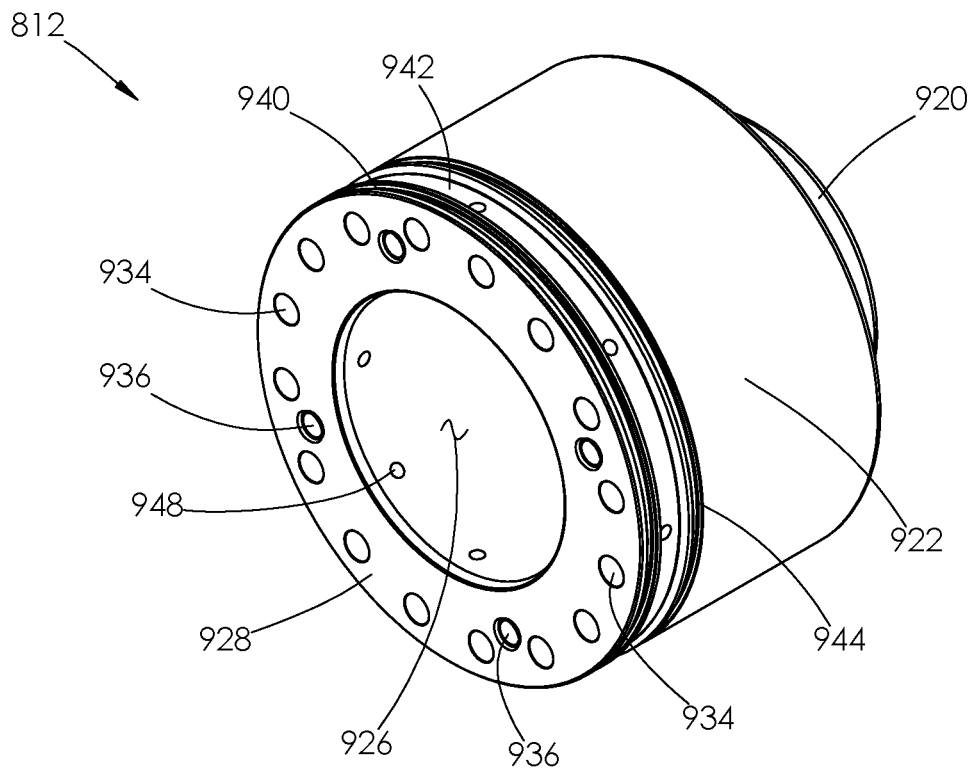
FIG. 36 is a rear perspective view of a stuffing box shown installed within the fluid end in FIGS. 19 and 20.
Figure 37:
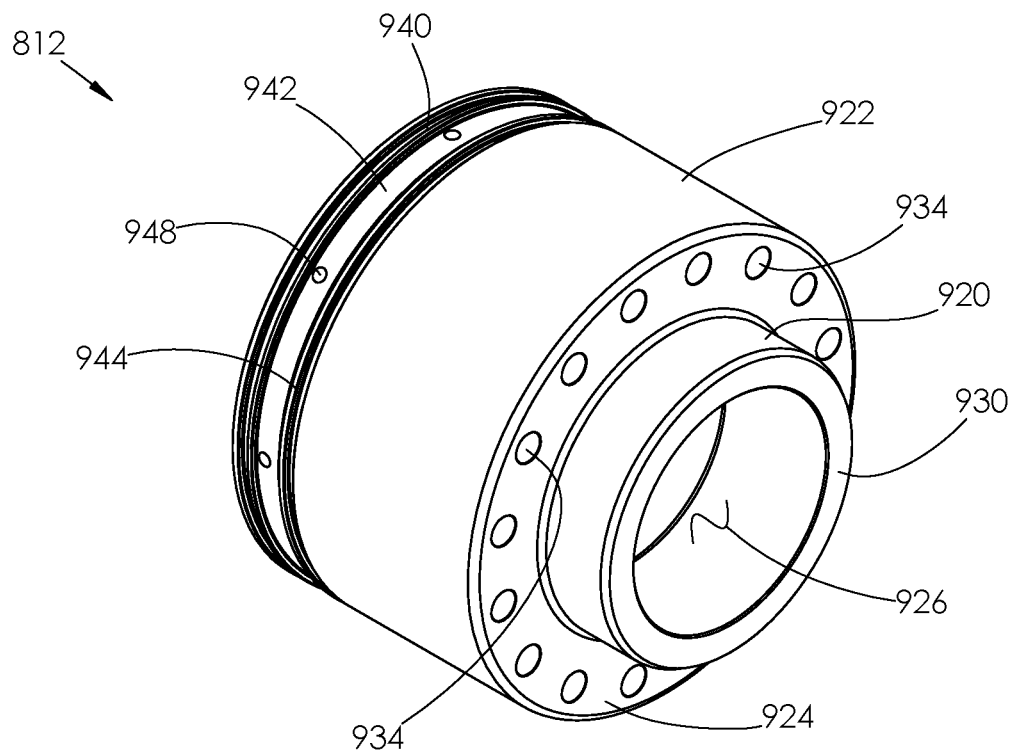
FIG. 37 is a front perspective view of the stuffing box shown in FIG. 36.

Continuing with FIGS. 36 and 37, a central passage 926 extends through the stuffing box 812 and interconnects the box's rear and front surfaces 928 and 930. An internal seat 932 is formed in the walls surrounding the central passage 926 adjacent the front surface 924 of the rear portion 922, as shown in FIG. 19. The internal seat 932 is formed as a result of the rear portion 922 having a larger inner diameter from that of the front portion 920.

The rear portion 922 has a generally uniform outside diameter along its length. A plurality of peripheral passages 934 are formed in the rear portion 922 and surround the central passage 926. The passages 934 interconnect the stuffing box's rear surface 928 and the front surface 924 of the rear portion 922. A plurality of threaded openings 936 are formed in the rear surface 928 of the stuffing box 812. The threaded openings 936 allow use of a tool for gripping the stuffing box 812 while it is being installed or removed.

Turning back to FIG. 20, when the stuffing box 812 is installed within the fluid end 800, a weep hole 938 is formed in the fluid end body 836 and faces the stuffing box 812. Because of the alignment between the weep hole 938 and the stuffing box 812, first, second, and third annular recesses 940, 942, and 944 are formed in an outer surface of the stuffing box 812, as shown in FIGS. 36 and 37. Each of the first and third recesses 940 and 944 are configured to house a seal 946, as shown in FIG. 19. Preferably, the seal 946 is an O-ring. The second recess 942 underlies the weep hole 938, and is interconnected with the stuffing box's central passage 926 by a plurality of spaced passages 948. Any fluid leaking around the sleeve 812 flows from the central passage 926, through the passages 948, into the second recess 942 and then into the weep hole 938.

Turning back to FIGS. 36 and 37, the outer surface of the stuffing box 812 includes no annular recess for housing a high pressure seal. Instead, an annular recess 950, configured to house an annular seal 952, is formed in the walls surrounding each plunger bore 814, as shown in FIG. 19. Preferably, the seal 952 is a high pressure seal.

Continuing with FIG. 19, each recess 950 is characterized by two side walls 954 joined by a base 956. The width of the base 956 is equal to at least one-third of the length of the front portion 920 of the stuffing box 812. The recess 950 is sized so as to house a large seal 952, much larger than an O-ring. The seal 952 is closely received within the recess 950 and may fill at least 95% of the volume of the recess 950. After a seal 952 is installed within a recess 950 formed within one of the plunger bores 814, a stuffing box 812 is installed within that bore 814.

When a stuffing box 812 is installed within a bore 814, the seal 952 tightly engages the outer surface of the stuffing box's front portion 920. During operation, the seal 952 wears against the front portion 920. If the outer surface of the front portion 920 begins to erode, allowing fluid to leak around the stuffing box 812, that stuffing box 812 can be removed and replaced with a new stuffing box. The seal 952 may also be removed and replaced with a new seal, if needed.

The seals 167 and 250 shown in FIGS. 3 and 6 may be identical to the seal 952. Likewise the seal 167 and 250 may be positioned in a recess that is identical to the recess 950.

Continuing with FIG. 20, a counterbore 958 is formed within the plunger bore 814. A plurality of openings 960 are formed in a base 962 of the counterbore 958. When a stuffing box 812 is installed within the plunger bore 814, the front surface 924 of the rear portion 922 engages the base 962 of the counterbore 958. Such engagement prevents further movement of the stuffing box 812 within the fluid end body 836. The stuffing box 812 is positioned within the plunger bore 814 such that its peripheral passages 934 and the openings 960 formed in the base 962 are aligned in a one-to-one relationship, as shown in FIG. 20.

Figure 38:
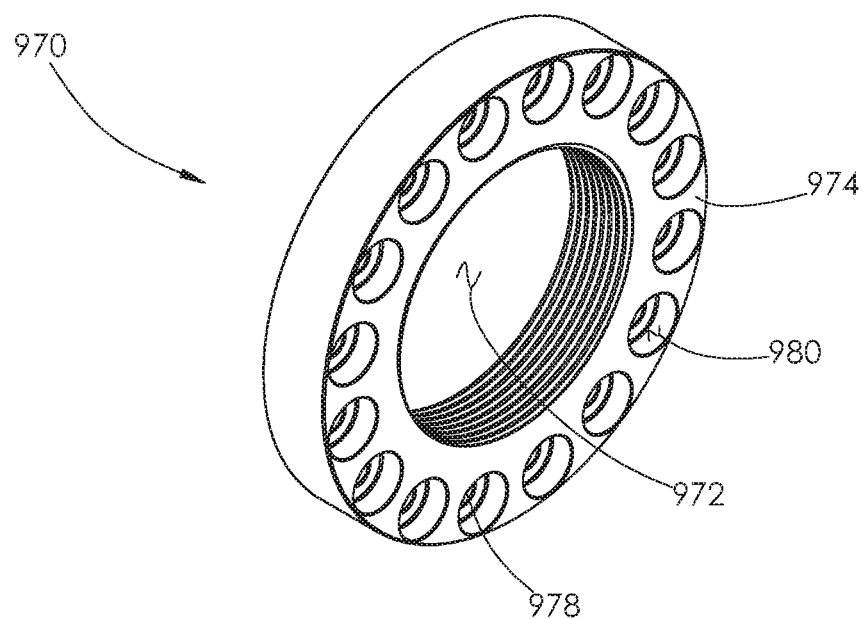
FIG. 38 is a rear perspective view of a retainer shown attached to the fluid end in FIGS. 19 and 20.
Figure 39:
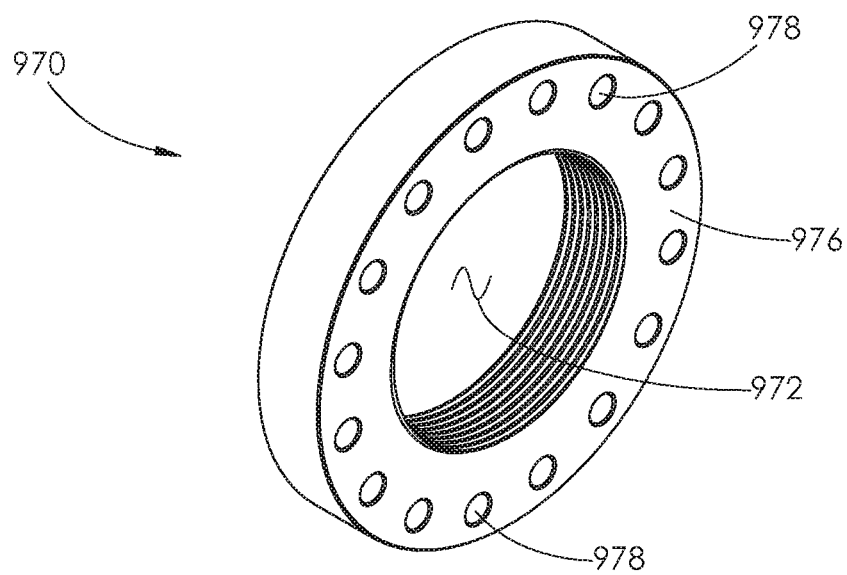
FIG. 39 is a front perspective view of the retainer shown in FIG. 38.

With reference to FIGS. 38 and 39, a retainer 970 prevents the stuffing box 812 from being dislodged from the plunger bore 814. The retainer 970 comprises a cylindrical body having an internally threaded central passage 972. The central passage 972 interconnects the retainer's rear and front surfaces 974 and 976. A plurality of peripheral passages 978 surround the central passage 972 and interconnect the retainer's rear and front surfaces 974 and 976. A counterbore 980 is formed within each passage 978, adjacent the top surface 974 of the retainer 970.

With reference to FIG. 20, the retainer 970 is installed within the plunger bore 814 so that its front surface 976 engages the rear surface 928 of the stuffing box 812. The retainer 970 is installed over the stuffing box 812 such that the peripheral passages 934 and the peripheral passages 978 are aligned in a one-to-one relationship.

Each of the retainers 970 is secured to the fluid end body 836 using a fastening system 982 shown in FIGS. 17 and 18. The fastening system 982 comprises a plurality of studs 984 and a plurality of nuts 986. Each of the studs 984 is received within a corresponding one of the openings 960 formed in the base 962. From the base 962, each stud 984 extends through a corresponding one of the passages 934 in the stuffing box 812, and through a corresponding one of the passages 978 in the retainer 970.

A first end 988 of each stud 984 is positioned within one of the counterbores 980 formed in the retainer 970. A nut 986 is then placed on a second end 987 of each stud 984, and turned until it tightly engages the base of the counterbore 980. In alternative embodiments, the fastening system may comprise a plurality of screws instead of studs and nuts. The screws are preferably socket-headed cap screws. In further alternative embodiments, the fastening system may comprise a plurality of bolts, such as 12-point bolts.

Attaching the retainer 970 to the fluid end body 836 also helps ensure the stuffing box 812 remains tightly in place during operation. Because each of the retainers 970 is attached to the fluid end body 836 using the fastening system 982, no external threads are formed on the outer surface of each of the retainer 970. Likewise, no internal threads are formed within the walls of each plunger bore 814.

Continuing with FIGS. 19 and 20, a plunger packing 990 is installed within the central passage 926 of each stuffing box 812. When installed, the plunger packing 990 engages the stuffing box's internal seat 932. Thus, the plunger packing 990 is only positioned within the rear portion 922 of the stuffing box 812 and is spaced away from the front portion 920 and the seal 952. The plunger packing 990 prevents high pressure fluid from passing around a plunger 991 as the plunger reciprocates. Each plunger packing 990 comprises a plurality of annular seals compressed together and having aligned central passages. The outer seals 994 may be made of metal and compress the inner pressure seals 996, as shown in FIG. 19. The inner pressure seals 996 are preferably high pressure seals. The seal 952 is approximately the same width as one of the pressure seals 996.

Over time, the seals 994 and 996 wear against the inner surface of the stuffing box 812. If leakage occurs, the stuffing box 812 may be removed and replaced with a new stuffing box.

The plunger packing 990 is held within the stuffing box 812 by a packing nut 992. The packing nut 992 is generally identical to the packing nut 182 shown in FIGS. 2 and 3. However, the packing nut 992 may vary slightly in size from the packing nut 182 in order to properly fit within the retainer 970 and stuffing box 812. External threads formed on the outer surface of the packing nut 992 matingly engage the internal threads formed in the retainer 970. An O-ring may be installed within a groove 993 formed within the packing nut 992, as shown in FIG. 19.

When a packing nut 992 is installed within one of the retainers 970, a front surface 998 of the packing nut 992 engages the plunger packing 990. Such engagement compresses the plunger packing 990, creating a tight seal. After a packing nut 992 has been installed within a retainer 970, a central passage within that packing nut 992 will be aligned with a central passage in a plunger packing 990.

When assembling the fluid end 800, the stuffing box 812 is installed within the plunger bore 814 after installation of the seal 952 within the recess 950. After the stuffing box 812 is installed, the retainer 970 may be secured to the housing using the fastening system 982. After the retainer 970 is attached to the fluid end body 836, the plunger packing 990 may be installed within the rear portion 922 of the stuffing box 812. The plunger packing 990 is installed through the rear surface 928 of the stuffing box 812. Alternatively, the plunger packing 990 may be installed within the stuffing box 812 prior to attaching the retainer 970 to the fluid end body 836. During operation, the plunger packing 990 may be removed and replaced with a new plunger packing 990 without removing the stuffing box 812 from the fluid end 800.

Once a stuffing box 812, plunger packing 990, retainer 970, and packing nut 992 are installed within a plunger bore 814, a plunger 991 is next installed, as shown in FIG. 20. Alternatively, the plunger 991 may be installed prior to installing the packing nut 992. Once installed, the plunger 991 is surrounded by the other components within the plunger bores 814. During operation, the plunger 991 moves relative to the fluid end 800 and the components installed within the plunger bores 814.

The plunger 991 is identical to the plunger 188 shown in FIGS. 2 and 3. A clamp 1000 is attached to the end of each plunger 991. The clamp 1000 secures its plunger 991 to a pony rod 1002, shown in FIG. 40.

Figure 40:
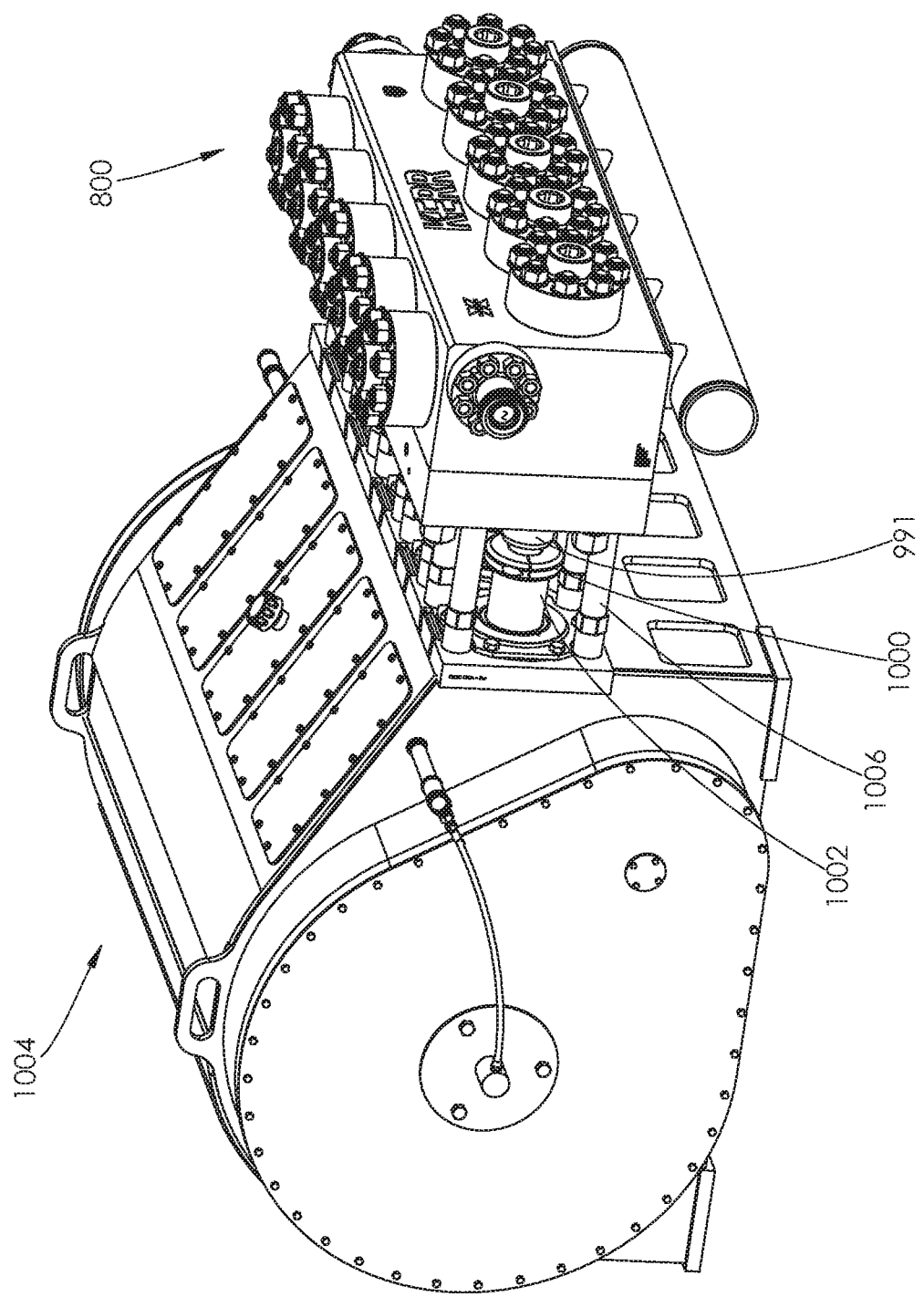
FIG. 40 is a side perspective view of the fluid end shown in FIG. 16 attached to a power end.

Continuing with FIG. 40, the fluid end 800 is shown attached to a power end 1004 via a plurality of stay rods 1006. The power end 1004 drives reciprocal motion of the plungers 991 within the fluid end 800. The fluid ends 100, 200, 300, 400, 500, or 600 may be attached to the power end 1004 in place of the fluid end 800.

Several kits are useful for assembling the fluid end 800. A first kit comprises a plurality of the components 804, a plurality of the components 806, a plurality of the components 812, a plurality of the retainers 890, a plurality of the retainers 970, and the fastening systems 910 and 982. The kit may be assembled using the fluid end body 836.

With reference to FIGS. 1-14 and 16-20, a single fluid end body may use any combination of the kits described herein. The fluid end bodies, components, and retainer elements described herein are preferably made of high strength steel.

While the fluid end bodies 102, 202, 302, 402, 502 and 836 shown in FIGS. 1-13 and 16-20 are substantially rectangular in shape, the kits described herein may also be used with any shape of a fluid end body, such as that shown in FIG. 14. Likewise, the retainer elements described herein may vary in shape and size, as desired. For example, the circular retainer elements described herein may be square or rectangular shaped.

The fastening systems 134, 222, 320, 420, 522 and 910 described herein each use eight studs around each bore opening. In alternative embodiments, more than eight studs or less than eight studs may be used to secure each retainer element over each bore opening. For example, FIG. 14 only shows six studs securing each retainer element 620 over each bore opening 610. Likewise, fewer than 16 or more than 16 screws may be used with the fastening systems 178, 260, 352, 444, and 982. The number of peripheral openings formed in each retainer element described herein may correspond with the number of openings formed around each bore opening in each fluid end body and the number of studs or screws being used.

The fastening systems described herein reduce the amount of torque required to secure each retainer element to the fluid end bodies. Rather than having to torque one large retaining nut, the torque is distributed throughout the plurality of studs, nuts, or screws. Decreasing the amount of torque required to seal the bores increases the safety of the assembly process.

Figure 15:
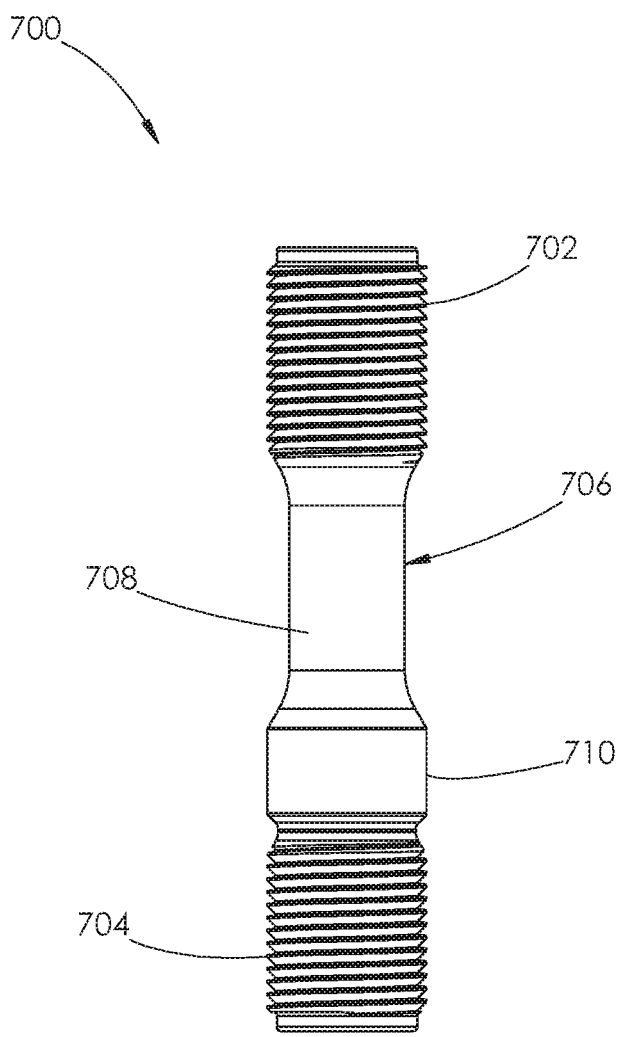
FIG. 15 is a side elevational view of one of the plurality of studs for use with the fluid ends.
Figure 16:
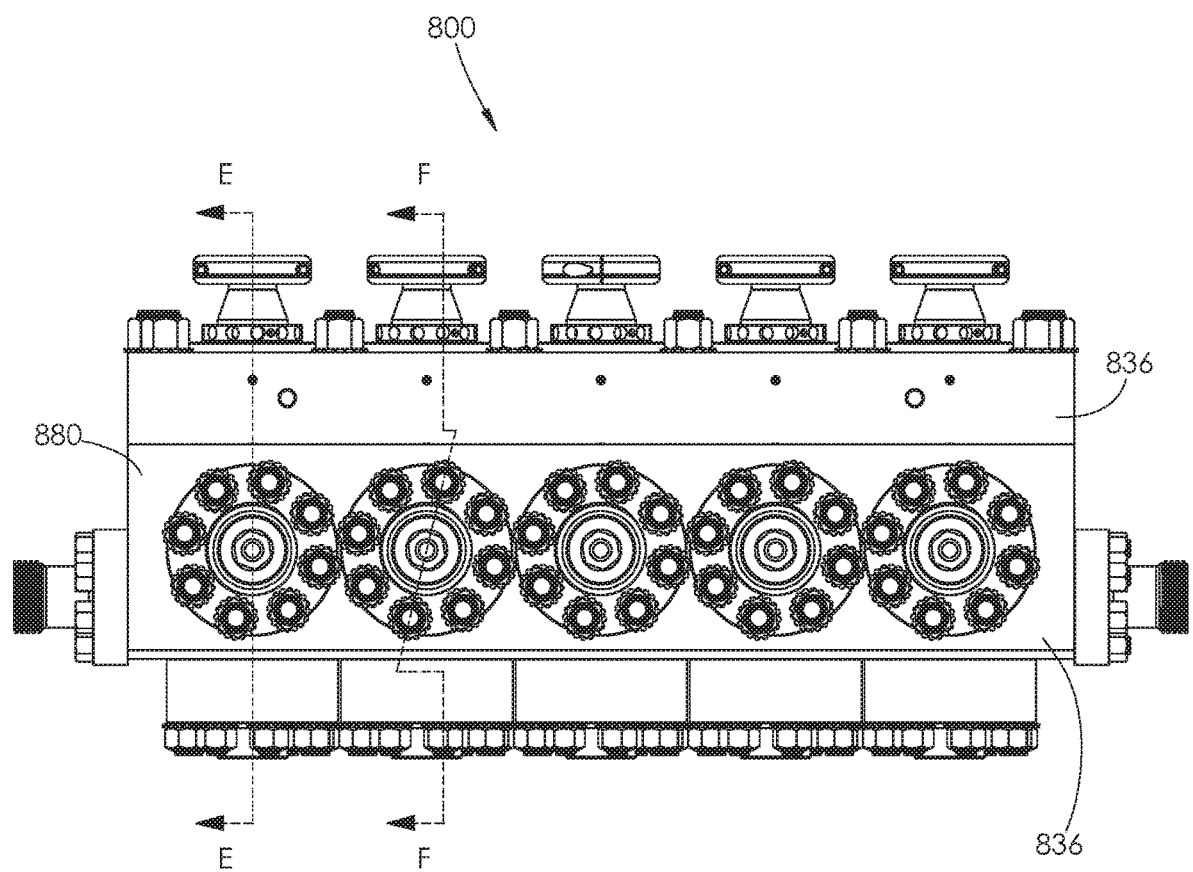
FIG. 16 is a top plan view of a seventh embodiment of a fluid end.

Turning to FIG. 15, a stud 700 is shown. The stud 700 may be used with the fastening systems 134, 222, 320, 420, 522, 626, and 910 shown in FIGS. 1, 4, 7, 9, 11, 14, 17 and 18. For exemplary purposes, the stud 700 will be described with reference to fluid end 100, shown in FIG. 1.

The stud 700 has a first threaded section 702 and an opposite second threaded section 704. The threaded sections 702 and 704 are joined by an elongate, cylindrical body 706. The first threaded section 702 is configured for threading into one of the plurality of threaded openings 144 formed in the fluid end body 102. The second threaded section 704 is configured for threading into the threaded opening formed in one of the nuts 152.

The first section 702 may have fewer threads than that of the opening 144. For example, if the opening 144 has 18 internal threads, the first section 702 of the stud 700 may only have 16 external threads. This configuration ensures that all of the threads formed on the first section 702 will be engaged and loaded when the first end 702 is threaded into the opening 144. Engaging all of the threads helps to increase the fatigue life of the first end 702 of the stud 700. Likewise, the second section 704 may have fewer external threads than there are internal threads formed in the nut 152. The stud 700 may also be subjected to shot peening on its non-threaded sections prior to its use to help reduce the possibility of fatigue cracks. The stud 700 may have a smooth outer surface prior to performing shot peening operations.

The body 706 of the stud 700 comprises a first section 708 and a second section 710. The first section 708 has a smaller diameter than the second section 710. The retainer element 132 is primarily held on the first section 708 of the body 706. The diameter of the second section 710 is enlarged so that it may center the washer 150 on the stud 700.

The diameter of the second section 710 is configured so that it is only slightly smaller than the diameter of the central opening of the washer 150. This sizing allows the washer 150 to closely receive the second section 710 of the stud 700 when the washer 150 is positioned on the stud 700. When the washer 150 is positioned on the second section 710, the washer 150 is effectively centered on the stud 700. The washer 150 is also effectively centered against the nut 152, once the nut 152 is installed on the stud 700.

Without placing the washer 150 on the second section 710, the washer may have to be manually centered on the stud 700 prior to installing the nut 152. If the washer 150 is not properly centered on the stud 700 or against the nut 152, it may be difficult to effectively torque or un-torque the nut 152 from the stud 700, depending on the type of washer used.

The plurality of washers used with each fastening system 134, 222, 320, 420, 522, 626 and 910 shown in FIGS. 1, 4, 7, 9, 11, 14, 17 and 18 may be configured to allow a large amount of torque to be imposed on the nuts used with the washers without using a reaction arm. Instead, the washer itself may serve as the counterforce needed to torque a nut onto a stud. Not having to use a reaction arm increases the safety of the assembly process. The nuts used with the fastening systems 134, 222, 320, 420, 522, and 626 may also comprise a hardened inner layer to help reduce galling between the threads of the nuts and studs during the assembly process. An example of the above described washers, nuts, and methods are described in Patent Cooperation Treaty Application Serial No. PCT/US2017/020548, authored by Junkers, et al, the entirety of which is incorporated herein by reference.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid end assembly, comprising:
   a housing having an external surface and an internal chamber;
   a first conduit formed in the housing and having first and second sections, each section independently interconnecting the internal chamber and the external surface;
   a second conduit formed in the housing, intersecting the first conduit and having third and fourth sections, each section independently interconnecting the internal chamber and the external surface; in which no threads are formed in any portion of the housing that surrounds and faces the third section;
   a component installed within the third section, in which the component has opposed rear and front surfaces joined by inner and outer intermediate surfaces, in which no threads are formed in the inner and outer intermediate surfaces;
   a plurality of packing seals installed within the component;
   a retainer having opposed rear and front surfaces and defining a central opening, in which the front surface of the retainer abuts the rear surface of the component;
   a fastening system installed within the retainer and the housing and configured to releasably hold the retainer against the component; and
   a packing nut installed within the central opening of the retainer and configured to releasably hold the plurality of packing seals within the component.

2. The fluid end assembly of claim 1, in which the component has a cylindrical rear portion joined to a cylindrical front portion, in which an outer diameter of the rear portion is larger than an outer diameter of the front portion.

3. The fluid end assembly of claim 2, in which an inner diameter of the rear portion is larger than an inner diameter of the front portion.

4. The fluid end assembly of claim 2, in which the plurality of packing seals are installed through the rear surface of the component and are positioned within the rear portion of the component.

5. The fluid end assembly of claim 4, in which no packing seals are installed within the front portion of the component.

6. The fluid end of claim 4 in which an internal seat is formed within the rear portion of the component, in which the plurality of packing seals are part of a plunger packing, and in which the plunger packing abuts the internal seat.

7. The fluid end assembly of claim 2, in which a plurality of passages are formed in the rear portion, in which each passage interconnects the rear surface of the component and a base of the rear portion.

8. The fluid end assembly of claim 7, in which a plurality of passages are formed in the retainer, in which each passage interconnects the rear and front surfaces of the retainer; and in which the plurality of passages formed in the retainer are aligned with the plurality of passages formed in the rear portion of the component.

9. The fluid end assembly of claim 1, further comprising:
   an annular groove formed in the housing such that the groove surrounds the component; and
   a seal positioned within the groove, in which at least a portion of the seal engages with the component.

10. The fluid end of claim 1, in which the component has a cylindrical rear portion joined to a cylindrical front portion, in which an outer diameter of the rear portion is larger than an outer diameter of the front portion, and further comprising:
   an annular groove formed in the housing such that the groove surrounds the front portion; and
   a seal positioned within the groove, in which at least a portion of the seal engages with the front portion.

11. The fluid end assembly of claim 10, in which the annular groove is characterized by two side walls joined by a base.

12. The fluid end assembly of claim 11, in which a width of the base is equal to at least one-third of a length of the front portion.

13. The fluid end assembly of claim 1, in which the fastening system comprises:
   a plurality of threaded studs; and
   a plurality of nuts.

14. The fluid end assembly of claim 1, in which the fastening system comprises:
   a plurality of socket-headed screws.

15. The fluid end assembly of claim 1, in which the component is characterized as a tubular sleeve.

16. The fluid end assembly of claim 1, in which the component is characterized as a stuffing box.

17. The fluid end assembly of claim 1, further comprising:
   a suction plug installed within the fourth section.

18. An apparatus, comprising:
   a component configured for installation within a horizontal bore formed in a fluid end housing, the component comprising:
      a first portion joined to a second portion; in which the second portion has a greater diameter than the first portion; in which a length of the second portion is at least two times greater than a length of the first portion; in which the first and second portions define a central passage configured to receive a reciprocating plunger and an exterior surface extending between front and rear surfaces of the component; and in which no threads are formed in the central passage or the exterior surface; and
      a plurality of passages formed in the second portion and surrounding the central passage; in which the plurality of passages are parallel to the central passage; and
      in which the second portion of the component is configured to house a plurality of packing seals configured to receive the reciprocating plunger.

19. The apparatus of claim 18, in which the first portion is joined to the second portion at a right angle.

20. The apparatus of claim 18, in which the component is configured to be secured within the horizontal bore by a plurality of fasteners that extend through the plurality of passages and into the fluid end housing.

21. A fluid end assembly, comprising:
   a housing having an external surface and an internal chamber;
   a first conduit formed in the housing and having first and second sections, each section independently interconnecting the internal chamber and the external surface;
   a second conduit formed in the housing, intersecting the first conduit and having third and fourth sections, each section independently interconnecting the internal chamber and the external surface; in which no threads are formed in a wall of the housing surrounding the third section;
   a component installed within the third section, in which the component has opposed rear and front surfaces joined by inner and outer intermediate surfaces, in which no threads are formed in the inner and outer intermediate surfaces;
   a plurality of packing seals installed within the component;
   a retainer having opposed rear and front surfaces, in which the front surface of the retainer abuts the rear surface of the component; and
   a fastening system installed within the retainer and the housing and configured to releasably hold the retainer against the component, in which the fastening system comprises a plurality of socket-headed screws.

22. A fluid end assembly, comprising:
   a housing having an external surface and an internal chamber;
   a first conduit formed in the housing and having first and second sections, each section independently interconnecting the internal chamber and the external surface;
   a second conduit formed in the housing, intersecting the first conduit and having third and fourth sections, each section independently interconnecting the internal chamber and the external surface; in which no threads are formed in a wall of the housing surrounding the third section;
   a component installed within the third section, in which the component has opposed rear and front surfaces joined by inner and outer intermediate surfaces, in which no threads are formed in the inner and outer intermediate surfaces; in which the component has a cylindrical rear portion joined to a cylindrical front portion, and in which an outer diameter of the rear portion is larger than an outer diameter of the front portion;
   a plurality of packing seals installed within the component, in which the plurality of packing seals are installed through the rear surface of the component and are positioned within the rear portion of the component, in which an internal seat is formed within the rear portion of the component, in which the plurality of packing seals are part of a plunger packing, and in which the plunger packing abuts the internal seat;
   a retainer having opposed rear and front surfaces, in which the front surface of the retainer abuts the rear surface of the component; and
   a fastening system installed within the retainer and the housing and configured to releasably hold the retainer against the component.

\* \* \* \* \*